US011457788B2

(12) United States Patent
Han et al.

(10) Patent No.: US 11,457,788 B2
(45) Date of Patent: Oct. 4, 2022

(54) METHOD AND APPARATUS FOR EXECUTING CLEANING OPERATION

(71) Applicant: Samsung Electronics Co., Ltd., Suwon-si (KR)

(72) Inventors: Seungbeom Han, Suwon-si (KR); Jungkap Kuk, Suwon-si (KR); Hyunsuk Kim, Suwon-si (KR); Kyunghun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 795 days.

(21) Appl. No.: 16/391,834

(22) Filed: Apr. 23, 2019

(65) Prior Publication Data
US 2019/0343355 A1 Nov. 14, 2019

Related U.S. Application Data

(60) Provisional application No. 62/670,149, filed on May 11, 2018.

(30) Foreign Application Priority Data

Nov. 20, 2018 (KR) .......................... 10-2018-0143896

(51) Int. Cl.
 A47L 9/28 (2006.01)
(52) U.S. Cl.
 CPC .......... *A47L 9/2815* (2013.01); *A47L 9/2842* (2013.01); *A47L 9/2894* (2013.01); *A47L 2201/04* (2013.01); *A47L 2201/06* (2013.01)
(58) Field of Classification Search
 CPC .... A47L 9/2815; A47L 9/2842; A47L 9/2894; A47L 2201/04; A47L 2201/06;
(Continued)

(56) References Cited

U.S. PATENT DOCUMENTS 6,956,348 B2 * 10/2005 Landry ................. A47L 9/2831
 701/28
7,805,220 B2 * 9/2010 Taylor .................. G05D 1/0219
 318/568.17
(Continued)

FOREIGN PATENT DOCUMENTS

CN 2693167 Y 4/2005
CN 105411491 A * 3/2016 .......... A47L 11/4011
(Continued)

OTHER PUBLICATIONS

European Search Report dated May 26, 2021, issued in European Patent Application No. 19799537.6.
(Continued)

*Primary Examiner* — Bhavesh V Amin
(74) *Attorney, Agent, or Firm* — Jefferson IP Law, LLP

(57) ABSTRACT

A robotic cleaning apparatus for performing a cleaning operation and a method of cleaning a cleaning space therefor are provided. The method includes acquiring contamination data indicating a contamination level of the cleaning space, acquiring contamination map data based on the contamination data, determining at least one cleaning target area in the cleaning space, based on a current time and the contamination map data, and cleaning the determined at least one cleaning target area. The method and apparatus may relate to artificial intelligence (AI) systems for mimicking functions of human brains, e.g., cognition and decision, by using a machine learning algorithm such as deep learning, and applications thereof.

21 Claims, 24 Drawing Sheets

(58) Field of Classification Search
CPC .... A47L 9/2847; A47L 9/2852; A47L 9/2826; G05D 1/0044; G05D 2201/0203
See application file for complete search history.

(56) References Cited

U.S. PATENT DOCUMENTS

| | | | | |
|---|---|---|---|---|
| 8,463,018 B2* | 6/2013 | Chung | G05D 1/0274 | 15/340.1 |
| 8,508,376 B2* | 8/2013 | Knox | G08B 17/107 | 340/630 |
| 8,855,914 B1* | 10/2014 | Alexander | A47L 11/4011 | 15/49.1 |
| 8,903,589 B2* | 12/2014 | Sofman | B25J 9/0003 | 701/461 |
| 8,924,019 B2* | 12/2014 | Tang | A47L 9/2852 | 382/103 |
| 9,504,369 B2* | 11/2016 | So | A47L 9/2852 | |
| 9,988,781 B2* | 6/2018 | Pickover | B07C 5/34 | |
| 10,391,638 B2* | 8/2019 | Angle | G06Q 10/1095 | |
| 10,667,659 B2* | 6/2020 | Jung | B25J 9/0003 | |
| 10,918,252 B2* | 2/2021 | Suvarna | A47L 11/4011 | |
| 11,157,016 B2* | 10/2021 | Suvarna | A47L 9/2857 | |
| 2002/0095239 A1* | 7/2002 | Wallach | G05D 1/0295 | 700/245 |
| 2002/0153855 A1* | 10/2002 | Song | G05D 1/0246 | 318/568.12 |
| 2003/0212472 A1* | 11/2003 | McKee | G05D 1/0274 | 318/568.12 |
| 2004/0073337 A1* | 4/2004 | McKee | G05D 1/0274 | 700/245 |
| 2004/0211444 A1* | 10/2004 | Taylor | A47L 9/2894 | 134/21 |
| 2005/0171644 A1* | 8/2005 | Tani | A47L 9/2826 | 701/25 |
| 2005/0192707 A1* | 9/2005 | Park | G05D 1/0272 | 700/259 |
| 2005/0216122 A1* | 9/2005 | Tani | G05D 1/0274 | 701/23 |
| 2006/0047364 A1* | 3/2006 | Tani | A47L 9/009 | 701/23 |
| 2006/0069463 A1* | 3/2006 | Kim | A47L 7/0085 | 318/568.12 |
| 2007/0189757 A1* | 8/2007 | Steinberg | G06T 7/0008 | 348/E5.081 |
| 2007/0282484 A1* | 12/2007 | Chung | G05D 1/0238 | 700/245 |
| 2009/0185716 A1* | 7/2009 | Kato | H04N 5/367 | 382/103 |
| 2010/0268385 A1* | 10/2010 | Rew | G05D 1/0253 | 700/259 |
| 2012/0103367 A1* | 5/2012 | Tang | A47L 9/2805 | 901/1 |
| 2012/0169497 A1* | 7/2012 | Schnittman | G05D 1/0234 | 340/540 |
| 2012/0221187 A1* | 8/2012 | Jeon | G05D 1/0238 | 701/25 |
| 2012/0239191 A1* | 9/2012 | Versteeg | F41H 11/13 | 901/1 |
| 2012/0259481 A1* | 10/2012 | Kim | G05D 1/0044 | 701/25 |
| 2013/0226344 A1* | 8/2013 | Wong | B25J 9/1697 | 901/1 |
| 2013/0326839 A1* | 12/2013 | Cho | G05D 1/0246 | 701/2 |
| 2014/0116469 A1* | 5/2014 | Kim | A47L 9/2894 | 15/319 |
| 2014/0124004 A1* | 5/2014 | Rosenstein | G05D 1/0219 | 15/3 |
| 2014/0218517 A1* | 8/2014 | Kim | H04N 21/41407 | 348/143 |
| 2014/0336863 A1* | 11/2014 | So | A47L 9/2815 | 701/28 |
| 2015/0073612 A1* | 3/2015 | Ireland | G05B 19/0426 | 700/295 |
| 2015/0223659 A1* | 8/2015 | Han | G05D 1/0274 | 134/18 |
| 2015/0362921 A1* | 12/2015 | Hanaoka | G05D 1/0088 | 702/159 |
| 2016/0000288 A1* | 1/2016 | Soejima | A47L 9/2847 | 15/319 |
| 2016/0052133 A1* | 2/2016 | Kim | A47L 9/2852 | 901/1 |
| 2016/0089783 A1* | 3/2016 | Noh | G06K 9/6201 | 901/1 |
| 2016/0101524 A1* | 4/2016 | Noh | B25J 9/1676 | 901/1 |
| 2016/0104044 A1* | 4/2016 | Noh | B25J 9/1664 | 901/1 |
| 2016/0148417 A1* | 5/2016 | Kim | G06T 19/006 | 345/419 |
| 2016/0167233 A1* | 6/2016 | Zhang | G05D 1/0246 | 901/1 |
| 2016/0379092 A1* | 12/2016 | Kutliroff | G06N 3/0454 | 382/158 |
| 2017/0090456 A1* | 3/2017 | Mao | G05B 19/404 |
| 2017/0192435 A1* | 7/2017 | Bakhishev | G01S 5/02 |
| 2017/0273528 A1* | 9/2017 | Watanabe | A47L 5/22 |
| 2017/0303761 A1* | 10/2017 | Chang | A47L 11/4011 |
| 2017/0371341 A1* | 12/2017 | Leinhos | A47L 11/4011 |
| 2018/0055312 A1* | 3/2018 | Jung | G06T 19/006 |
| 2018/0074508 A1* | 3/2018 | Kleiner | G05D 1/0219 |
| 2018/0080188 A1* | 3/2018 | Pickover | E01H 12/002 |
| 2018/0284786 A1* | 10/2018 | Moshkina-Martinson | A47L 9/2847 |
| 2019/0018420 A1* | 1/2019 | Yee | A47L 9/2831 |
| 2019/0029486 A1* | 1/2019 | Suvarna | A47L 11/4061 |
| 2019/0208979 A1* | 7/2019 | Bassa | G06K 9/6273 |
| 2019/0346849 A1* | 11/2019 | Moshkina-Martinson | G05D 1/0274 |
| 2020/0019169 A1* | 1/2020 | Suvarna | A47L 11/4061 |
| 2020/0019178 A1* | 1/2020 | Orzechowski | G05D 1/0217 |
| 2020/0069140 A1* | 3/2020 | Orzechowski | G05D 1/0022 |
| 2021/0038041 A1* | 2/2021 | Pruiett | A47L 9/2805 |
| 2021/0068604 A1* | 3/2021 | So | A47L 9/19 |

FOREIGN PATENT DOCUMENTS

| | | |
|---|---|---|
| CN | 105411491 A | 3/2016 |
| CN | 107518826 A | 12/2017 |
| CN | 107943044 A | 4/2018 |
| CN | 107997692 A | 5/2018 |
| EP | 2 508 957 A1 | 10/2012 |
| EP | 3 032 369 A2 | 6/2016 |
| EP | 3 072 432 A1 | 9/2016 |
| KR | 10-0962593 B1 | 6/2010 |
| KR | 10-2010-0109289 A | 10/2010 |
| KR | 10-2011-0053767 A | 5/2011 |
| KR | 10-1320775 B1 | 10/2013 |
| KR | 10-1459245 B1 | 11/2014 |
| KR | 10-2015-0009048 A | 1/2015 |
| KR | 10-1499966 B1 | 3/2015 |
| WO | 2014/196272 A1 | 12/2014 |

OTHER PUBLICATIONS

Chinese Office Action dated Jun. 22, 2021, issued in Chinese Patent Application No. 201980031671.5.
International Search Report dated Jul. 31, 2019, issued in an International application No. PCT/KR2019/004887.
Chinese Office Action with English translation dated Mar. 2, 2022; Chinese Appln. No. 201980031671.5.

* cited by examiner

FIG. 13

| OPERATION MODE | DESCRIPTION |
|---|---|
| NORMAL MODE | OPERATION MODE FOR NORMAL CLEANING |
| QUICK MODE | OPERATION MODE FOR QUICK CLEANING |
| LOW-NOISE MODE | OPERATION MODE FOR MINIMIZING NOISE |
| POWER-SAVING MODE | OPERATION MODE FOR REDUCING BATTERY CONSUMPTION |

METHOD AND APPARATUS FOR EXECUTING CLEANING OPERATION

CROSS-REFERENCE TO RELATED APPLICATION(S)

This application is based on and claims priority under 35 U.S.C. § 119(e) of a U.S. Provisional application Ser. No. 62/670,149, filed on May 11, 2018, in the U.S. Patent and Trademark Office, and under 35 U.S.C. § 119(a) of a Korean patent application number 10-2018-0143896, filed on Nov. 20, 2018, in the Korean Intellectual Property Office, each of the disclosures is incorporated by reference herein in its entirety.

BACKGROUND

1. Field

The disclosure relates to a method and apparatus for executing a cleaning operation, based on a contamination level of a cleaning space.

2. Description of Related Art

Artificial intelligence (AI) systems are computer systems for implementing human-level intelligence. Unlike general rule-based smart systems, the AI systems autonomously learn and make decisions, and get smarter. The more the AI systems are used, the more recognition rates of the AI systems increase and the more accurately the AI systems understand user preferences. As such, the general rule-based smart systems are increasingly replaced by deep-learning-based AI systems. AI technology includes machine learning (or deep learning) and element technologies using machine learning.

Machine learning is an algorithm technology for autonomously classifying and learning features of input data, and element technologies are technologies for mimicking functions of human brains, e.g., cognition and decision, by using a machine learning algorithm such as deep learning, and include technological fields such as linguistic understanding, visual understanding, inference/prediction, knowledge expression, and operation control.

Various fields to which the AI technology is applicable are as follows. Linguistic understanding is a technology for recognizing and applying/processing verbal or written languages of people, and includes natural language processing, machine translation, dialogue systems, questions and answers, speech recognition/synthesis, etc. Visual understanding is a technology for recognizing and processing objects as in human views, and includes object recognition, object tracking, image search, human recognition, scene understanding, space understanding, image enhancement, etc. Inference/prediction is a technology for determining and logically inferring and predicting information, and includes knowledge/probability-based inference, optimized prediction, preference-based planning, recommendation, etc. Knowledge expression is a technology for automating human experience information into knowledge data, and includes knowledge construction (e.g., data generation/classification), knowledge management (e.g., data utilization), etc. Operation control is a technology for controlling autonomous driving of vehicles and motion of robots, and includes motion control (e.g., steering, collision, or driving control), manipulation control (e.g., behavior control), etc.

Robotic cleaning apparatuses need to efficiently clean a cleaning space in various operation modes and environments, and thus a technology for appropriately determining a cleaning target area under various conditions is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robotic cleaning system and method capable of generating contamination map data based on a contamination level of a cleaning space, per a time period, and using the contamination map data.

Another aspect of the disclosure is to provide a robotic cleaning system and method capable of determining a cleaning target area and a priority of the cleaning target area by using a learning model.

Another aspect of the disclosure is to provide a robotic cleaning system and method capable of efficiently controlling a robotic cleaning apparatus in a plurality of operation modes and environments by using contamination map data per a time period.

Additional aspects will be set forth in part in the description which follows and, in part, will be apparent from the description, or may be learned by practice of the presented embodiments.

In accordance with an aspect of the disclosure, a robotic cleaning apparatus for cleaning a cleaning space is provided. The robotic cleaning apparatus includes a communication interface, a memory storing one or more instructions, and at least one processor configured to execute the one or more instructions to control the robotic cleaning apparatus, execute the one or more instructions to acquire contamination data indicating a contamination level of the cleaning space, acquire contamination map data based on the contamination data, determine at least one cleaning target area in the cleaning space, based on a current time and the contamination map data, and clean the determined at least one cleaning target area, wherein the contamination map data includes information indicating locations of contaminated areas in the cleaning space, contamination levels of the contaminated areas, and locations of objects in the cleaning space, and is stored for a predetermined time period.

In accordance with another aspect of the disclosure, a method, performed by a robotic cleaning apparatus, of cleaning a cleaning space is provided. The method includes acquiring contamination data indicating a contamination level of the cleaning space, acquiring contamination map data based on the contamination data, determining at least one cleaning target area in the cleaning space, based on a current time and the contamination map data, and cleaning the determined at least one cleaning target area, wherein the contamination map data includes information indicating locations of contaminated areas in the cleaning space, contamination levels of the contaminated areas, and locations of objects in the cleaning space, and wherein the contamination map data is stored for a predetermined time period.

In accordance with another aspect of the disclosure, a non-transitory computer program product is provided. The non-transitory computer program product includes a computer-readable recording medium having recorded thereon a plurality of instructions that instruct at least one processor to perform the method above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a table for describing operation modes of the robotic cleaning apparatus, according to an embodiment of the disclosure;

Throughout the drawings, like reference numerals will be understood to refer to like parts, components, and structures.

DETAILED DESCRIPTION

Figure 1:
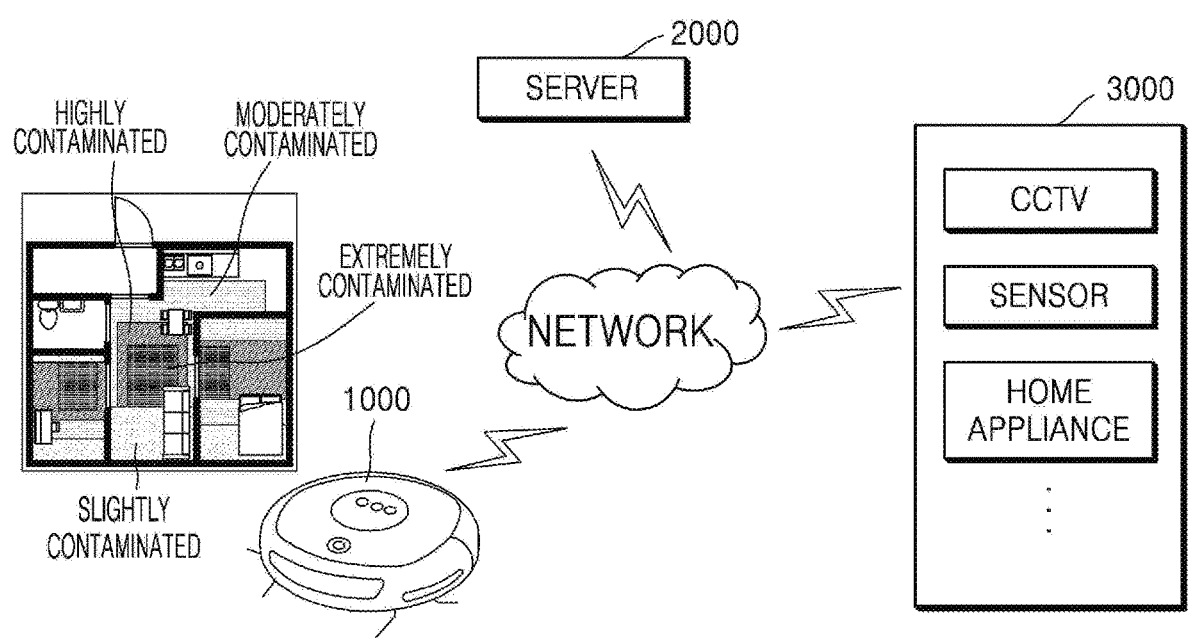
FIG. 1 is a schematic diagram of a cleaning system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the disclosure will be described in detail by explaining embodiments of the disclosure with reference to the attached drawings. The disclosure may, however, be embodied in many different forms and should not be construed as being limited to the various embodiments of the disclosure set forth herein; rather, these embodiments of the disclosure are provided so that this disclosure will be thorough and complete, and will fully convey the concept of the disclosure to one of ordinary skill in the art. In the drawings, parts not related to the disclosure are not illustrated for clarity of explanation, and like reference numerals denote like elements.

It will be understood that when an element is referred to as being "connected to" another element, it may be "directly connected to" the other element or be "electrically connected to" the other element through an intervening element. It will be further understood that the terms "includes" and/or "including", when used herein, specify the presence of stated elements, but do not preclude the presence or addition of one or more other elements, unless the context clearly indicates otherwise. Throughout the disclosure, the expression "at least one of a, b or c" indicates only a, only b, only c, both a and b, both a and c, both b and c, all of a, b, and c, or variations thereof.

The disclosure will now be described in detail with reference to the attached drawings.

FIG. 1 is a schematic diagram of a cleaning system according to an embodiment of the disclosure.

Referring to FIG. 1, the cleaning system according to an embodiment of the disclosure may include a robotic cleaning apparatus 1000, a server 2000, and at least one external device 3000.

The robotic cleaning apparatus 1000 may clean a cleaning space while moving in the cleaning space. The cleaning space may be a space to be cleaned, e.g., a home or an office. The robotic cleaning apparatus 1000 is a robotic apparatus capable of autonomously moving by using wheels or the like, and may perform a cleaning function while moving in the cleaning space.

The robotic cleaning apparatus 1000 may collect contamination data about contamination in the cleaning space, generate contamination map data and determine a cleaning target area, based on the generated contamination map data.

The robotic cleaning apparatus 1000 may predict contaminated regions in the cleaning space by using the contamination map data and determine a priority of and a cleaning strength for the cleaning target area considering the predicted contaminated regions. The contamination map data may include map information of the cleaning space and information indicating contaminated areas, and the robotic cleaning apparatus 1000 may generate the contamination map data per a certain time period (e.g., a predetermined time period).

The robotic cleaning apparatus 1000 may use at least one learning model to generate the contamination map data and determine the cleaning target area. The learning model may be operated by at least one of the robotic cleaning apparatus 1000 or the server 2000.

The server 2000 may generate the contamination map data and determine the cleaning target area in association with the robotic cleaning apparatus 1000. The server 2000 may comprehensively manage a plurality of robotic cleaning apparatuses and a plurality of external devices 3000. The server 2000 may use information collected from another robotic cleaning apparatus (not shown), contamination map data of another cleaning space, etc. to determine the contamination map data and the cleaning target area of the robotic cleaning apparatus 1000.

The external device 3000 may generate contamination data about contamination in the cleaning space and data required to determine a status of the cleaning space and provide the generated data to the robotic cleaning apparatus 1000 or the server 2000. The external device 3000 may be installed in the cleaning space. The external device 3000 may include, for example, a closed-circuit television (CCTV), a sensor, or a home appliance, but is not limited thereto.

A network is a comprehensive data communication network capable of enabling appropriate communication between network entities illustrated in FIG. 1, e.g., a local area network (LAN), a wide area network (WAN), a value added network (VAN), a mobile radio communication network, a satellite communication network, or a combination thereof, and may include the wired Internet, the wireless Internet, and a mobile communication network. Wireless communication may include, for example, wireless local area network (WLAN) (or Wi-Fi) communication, Bluetooth communication, Bluetooth low energy (BLE) communication, Zigbee communication, Wi-Fi direct (WFD) communication, ultra-wideband (UWB) communication, Infrared Data Association (IrDA) communication, and near field communication (NFC), but is not limited thereto.

Figure 2:
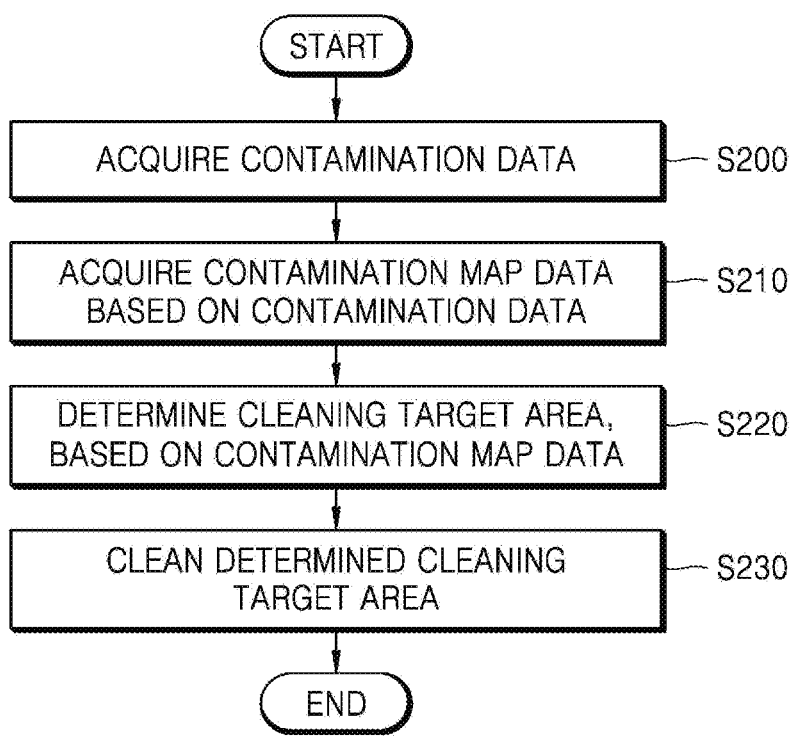
FIG. 2 is a flowchart of a method, performed by a robotic cleaning apparatus, of determining a cleaning target area, based on contamination data, according to an embodiment of the disclosure.

FIG. 2 is a flowchart of a method, performed by the robotic cleaning apparatus 1000, of determining a cleaning target area, based on contamination data, according to an embodiment of the disclosure.

In operation S200, the robotic cleaning apparatus 1000 may acquire contamination data. The robotic cleaning apparatus 1000 may generate contamination data of a cleaning space by using a camera and a sensor of the robotic cleaning apparatus 1000. The robotic cleaning apparatus 1000 may generate image data indicating a contamination level of the cleaning space, by photographing the cleaning space with the camera while cleaning the cleaning space. The robotic cleaning apparatus 1000 may generate sensing data indicating a dust quantity in the cleaning space, by sensing the cleaning space through a dust sensor while cleaning the cleaning space.

The robotic cleaning apparatus 1000 may receive contamination data from the external device 3000. For example, a CCTV installed in the cleaning space may photograph the cleaning space and, when a motion of contaminating the cleaning space is detected, the CCTV may provide image data including the detected motion, to the robotic cleaning apparatus 1000. For example, a dust sensor installed in the cleaning space may provide sensing data about a dust quantity of the cleaning space to the robotic cleaning apparatus 1000.

The external device 3000 may provide the contamination data generated by the external device 3000, to the server 2000, and the robotic cleaning apparatus 1000 may receive the contamination data generated by the external device 3000, from the server 2000.

The contamination data may be used to determine a contaminated location and a contamination level of the cleaning space. For example, the contamination data may include information about a location where and a time when the contamination data is generated.

In operation S210, the robotic cleaning apparatus 1000 may acquire contamination map data based on the contamination data. The robotic cleaning apparatus 1000 may generate and update the contamination map data by using the acquired contamination data. The contamination map data may include a map of the cleaning space and information indicating locations and contamination levels of contaminated areas in the cleaning space. The contamination map data may be generated per a time period and indicate the locations and the contamination levels of the contaminated areas in the cleaning space, in each time period.

The robotic cleaning apparatus 1000 may generate map data of the cleaning space by recognizing a location of the robotic cleaning apparatus 1000 while moving. The robotic cleaning apparatus 1000 may generate the contamination map data indicating the contaminated areas in the cleaning space, by using the contamination data and the map data.

The map data of the cleaning space may include, for example, data about at least one of a navigation map used to move while cleaning, a simultaneous localization and mapping (SLAM) map used for location recognition, or an obstacle recognition map including information about recognized obstacles.

The contamination map data may indicate, for example, locations of rooms and furniture in the cleaning space, and include information about the locations and the contamination levels of the contaminated areas in the cleaning space.

The robotic cleaning apparatus 1000 may generate the contamination map data by, for example, applying the map data and the contamination data of the cleaning space to a learning model for generating the contamination map data.

Alternatively, the robotic cleaning apparatus 1000 may request the contamination map data from the server 2000. In this case, the robotic cleaning apparatus 1000 may provide the map data and the contamination data of the cleaning space to the server 2000, and the server 2000 may generate the contamination map data by applying the map data and the contamination data of the cleaning space to the learning model for generating the contamination map data.

In operation S220, the robotic cleaning apparatus 1000 may determine a cleaning target area, based on the contamination map data. The robotic cleaning apparatus 1000 may predict the locations and the contamination levels of the contaminated areas in the cleaning space, based on the contamination map data and determine at least one cleaning target area, based on an operation mode and an apparatus state of the robotic cleaning apparatus 1000.

The robotic cleaning apparatus 1000 may determine a priority of and a cleaning strength for the cleaning target area in the cleaning space considering the operation mode and the apparatus state of the robotic cleaning apparatus 1000. The robotic cleaning apparatus 1000 may determine the cleaning strength of the robotic cleaning apparatus 1000 by, for example, determining a speed and suction power of the robotic cleaning apparatus 1000. For example, at a high cleaning strength, the robotic cleaning apparatus 1000 may strongly suck up dust while moving slowly. For example, at a low cleaning strength, the robotic cleaning apparatus 1000 may weakly suck up dust while moving fast. For example, the robotic cleaning apparatus 1000 may strongly suck up dust while moving fast, or weakly suck up dust while moving slowly.

The operation mode of the robotic cleaning apparatus 1000 may include, for example, a normal mode, a quick mode, a power-saving mode, and a low-noise mode, but is not limited thereto. For example, when the operation mode of the robotic cleaning apparatus 1000 is the quick mode, the robotic cleaning apparatus 1000 may determine the cleaning target area and the priority of the cleaning target area considering an operating time of the robotic cleaning apparatus 1000 to preferentially clean a seriously contaminated area within the operating time. For example, when the operation mode of the robotic cleaning apparatus 1000 is the low-noise mode, the robotic cleaning apparatus 1000 may determine the cleaning target area and the cleaning strength to clean a seriously contaminated area with low noise. For example, the robotic cleaning apparatus 1000 may determine the cleaning target area and the priority of the cleaning target area considering a battery level of the robotic cleaning apparatus 1000.

The robotic cleaning apparatus 1000 may determine the cleaning target area by applying information about the robotic cleaning apparatus 1000 and the cleaning space to a learning model for determining the cleaning target area. For example, the robotic cleaning apparatus 1000 may determine the cleaning target area, the priority of and the cleaning strength for the cleaning target area, etc. by inputting information about the operation mode of the robotic cleaning apparatus 1000, the apparatus state of the robotic cleaning apparatus 1000, and a motion of a user in the cleaning space, to the learning model for determining the cleaning target area.

In operation S230, the robotic cleaning apparatus 1000 may clean the determined cleaning target area. The robotic cleaning apparatus 1000 may clean the cleaning space according to the priority of and the cleaning strength for the cleaning target area. The robotic cleaning apparatus 1000 may collect contamination data about contamination of the cleaning space in real time while cleaning, and change the cleaning target area by reflecting the contamination data collected in real time.

Figure 3:
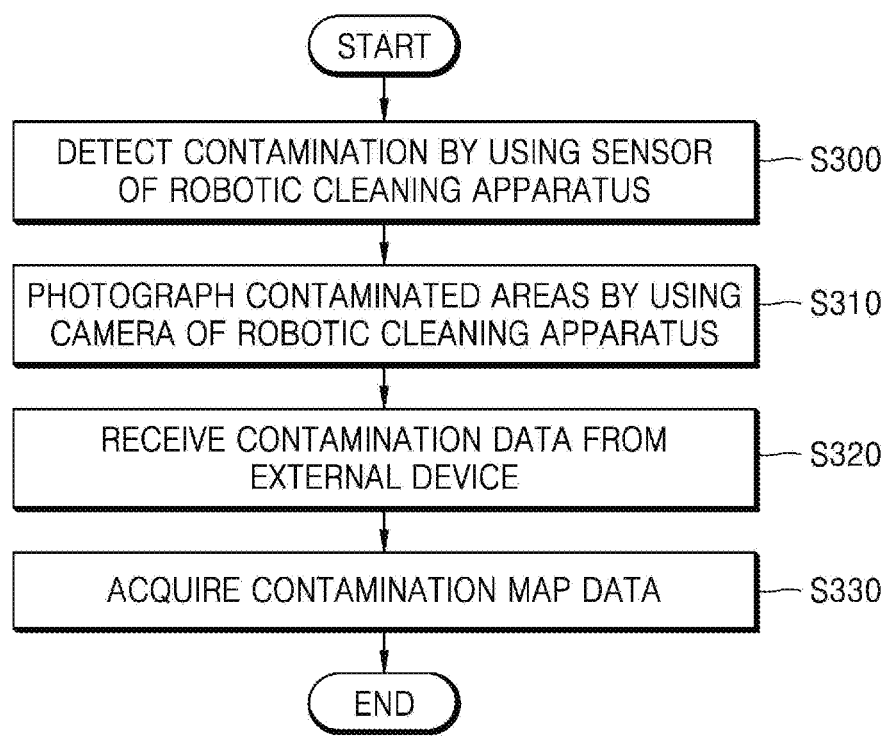
FIG. 3 is a flowchart of a method, performed by the robotic cleaning apparatus, of acquiring contamination data, according to an embodiment of the disclosure.

FIG. 3 is a flowchart of a method, performed by the robotic cleaning apparatus 1000, of acquiring contamination data, according to an embodiment of the disclosure.

In operation S300, the robotic cleaning apparatus 1000 may detect contamination by using a sensor of the robotic cleaning apparatus 1000. The robotic cleaning apparatus 1000 may include, for example, an infrared sensor, an ultrasonic sensor, a radio frequency (RF) sensor, a geomagnetic sensor, a position sensitive device (PSD) sensor, and a dust sensor. The robotic cleaning apparatus 1000 may detect a location and motion of the robotic cleaning apparatus 1000 and determine locations and contamination levels of contaminated areas by using the sensors of the robotic cleaning apparatus 1000 while cleaning. The robotic cleaning apparatus 1000 may generate contamination data including information about the contamination levels measured in the contaminated areas and the locations of the contaminated areas. The robotic cleaning apparatus 1000 may include, in the contamination data, information about a time when the contamination data is generated.

In operation S310, the robotic cleaning apparatus 1000 may photograph the contaminated areas by using a camera of the robotic cleaning apparatus 1000. The robotic cleaning apparatus 1000 may generate image data of contaminants by photographing the contaminated areas determined as having the contaminants, while cleaning. The robotic cleaning apparatus 1000 may include, in the contamination data, information about a time when the contamination data is generated.

In operation S320, the robotic cleaning apparatus 1000 may receive contamination data from the external device 3000. At least one external device 3000 may be installed in a cleaning space to generate the contamination data. When contamination occurs in an area near a location where the external device 3000 is installed, the external device 3000 may generate and provide the contamination data to the robotic cleaning apparatus 1000. In this case, the robotic cleaning apparatus 1000 may determine the location of the external device 3000 in the cleaning space by communicating with the external device 3000. The robotic cleaning apparatus 1000 may determine the location of the external device 3000 in the cleaning space by determining the location of the robotic cleaning apparatus 1000 in the cleaning space and a relative location between the robotic cleaning apparatus 1000 and the external device 3000. Alternatively, the external device 3000 may determine the location thereof in the cleaning space and provide information indicating the location of the external device 3000, to the robotic cleaning apparatus 1000.

The external device 3000 may include, for example, a CCTV, an Internet protocol (IP) camera, an ultrasonic sensor, an infrared sensor, and a dust sensor. For example, when the external device 3000 is a CCTV installed in the cleaning space, the CCTV may continuously photograph the cleaning space and, when a motion of contaminating the cleaning space is detected, the CCTV may provide video data or captured image data including the detected motion, to the robotic cleaning apparatus 1000. For example, when the external device 3000 is a dust sensor installed in the cleaning space, the dust sensor may provide sensing data about a dust quantity of the cleaning space to the robotic cleaning apparatus 1000 in real time or periodically. For example, when the external device 3000 is a home appliance, the home appliance may provide information about an operating state thereof to the robotic cleaning apparatus 1000 in real time or periodically. The external device 3000 may include, in the contamination data, information about a time when the contamination data is generated.

In operation S330, the robotic cleaning apparatus 1000 may acquire contamination map data. The robotic cleaning apparatus 1000 may generate the contamination map data by analyzing the contamination data generated by the robotic cleaning apparatus 1000 and the contamination data generated by the external device 3000. The contamination data may include information about the locations and the contamination levels of the contaminated areas in the cleaning space.

The robotic cleaning apparatus 1000 may generate the contamination map data indicating a contaminated location and a contamination level in the cleaning space, by using map data of the cleaning space and the contamination data acquired in operations S300 to S320. The robotic cleaning apparatus 1000 may generate the contamination map data per a time period.

The robotic cleaning apparatus 1000 may generate the contamination map data by data about motion of the robotic cleaning apparatus 1000 and the contamination data to a learning model for generating the contamination map data. In this case, the learning model for generating the contamination map data may be previously learned by the robotic cleaning apparatus 1000 or the server 2000. Alternatively, for example, the robotic cleaning apparatus 1000 may provide the data about motion of the robotic cleaning apparatus 1000 and the contamination data to the server 2000, and the server 2000 may apply the data about motion of the robotic cleaning apparatus 1000 and the contamination data to the learning model for generating the contamination map data.

Figure 4:
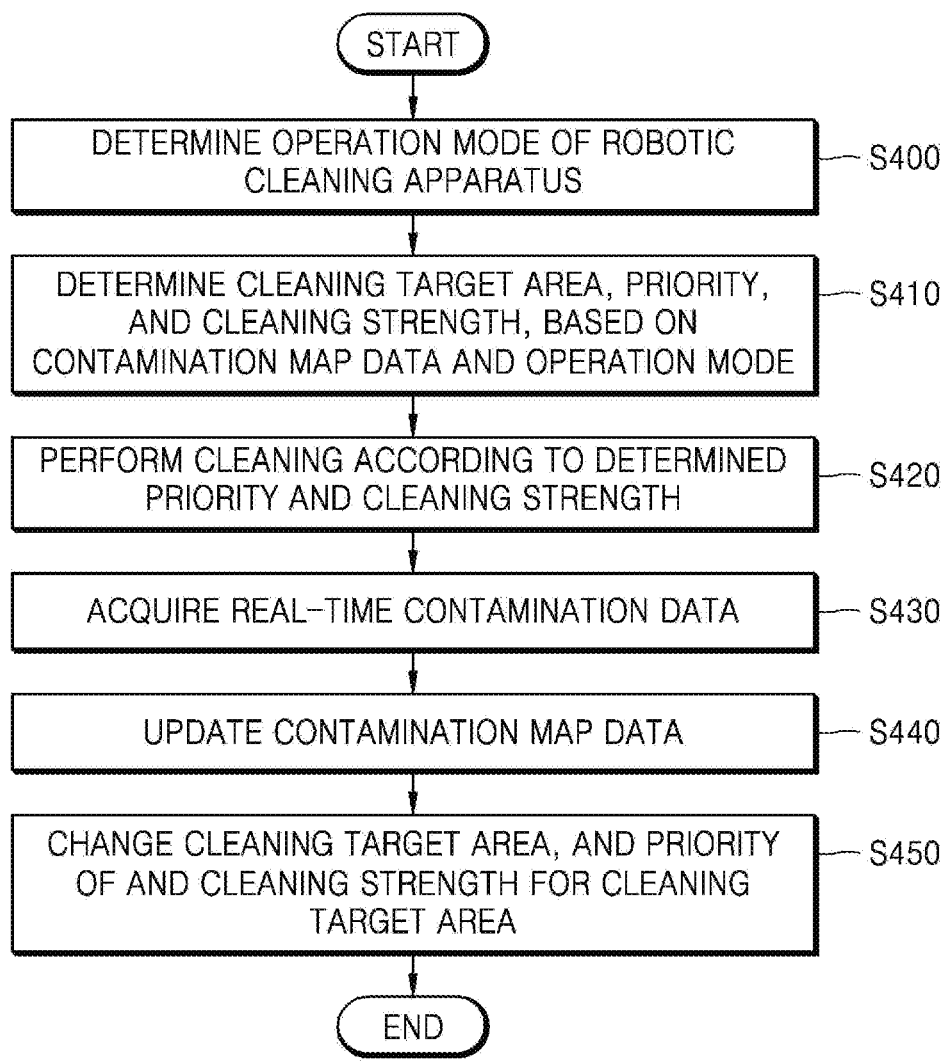
FIG. 4 is a flowchart of a method, performed by the robotic cleaning apparatus, of determining a priority of and a cleaning strength for a cleaning target area considering an operation mode of the robotic cleaning apparatus, according to an embodiment of the disclosure.

FIG. 4 is a flowchart of a method, performed by the robotic cleaning apparatus 1000, of determining a priority of and a cleaning strength for a cleaning target area considering an operation mode of the robotic cleaning apparatus 1000, according to an embodiment of the disclosure.

In operation S400, the robotic cleaning apparatus 1000 may determine an operation mode of the robotic cleaning apparatus 1000. The robotic cleaning apparatus 1000 may determine the operation mode of the robotic cleaning apparatus 1000 considering an environment of a cleaning space, a current time, and an apparatus state of the robotic cleaning apparatus 1000. For example, the robotic cleaning apparatus 1000 may determine the operation mode of the robotic cleaning apparatus 1000 considering information about whether a user is present in the cleaning space, information about a motion of the user, a current time, a battery level of the robotic cleaning apparatus 1000, etc. In this case, the robotic cleaning apparatus 1000 may determine the operation mode of the robotic cleaning apparatus 1000 by collecting the information about whether a user is present in the cleaning space, the information about a motion of the user, the current time, and the battery level of the robotic cleaning apparatus 1000 and analyzing the collected information.

The operation mode of the robotic cleaning apparatus 1000 may include, for example, a normal mode, a quick mode, a power-saving mode, and a low-noise mode, but is not limited thereto. The operation mode of the robotic cleaning apparatus 1000 will be described in detail below.

The robotic cleaning apparatus 1000 may determine the operation mode of the robotic cleaning apparatus 1000, based on a user input.

In operation S410, the robotic cleaning apparatus 1000 may determine a priority of and a cleaning strength for a cleaning target area, based on contamination map data and the operation mode. For example, when the operation mode is the quick mode, the robotic cleaning apparatus 1000 may determine the cleaning target area, and the priority of and the cleaning strength for the cleaning target area to clean only a cleaning target area having a contamination level equal to or greater than a certain value. For example, when the operation mode is the low-noise mode, the robotic cleaning apparatus 1000 may determine the cleaning target area, and the priority of and the cleaning strength for the cleaning target area to slowly clean a cleaning target area having a contamination level equal to or greater than a certain value, at a low cleaning strength.

Although the robotic cleaning apparatus 1000 determines the cleaning target area, the priority of the cleaning target area, and the cleaning strength for the cleaning target area according to the operation mode in the above description, the disclosure is not limited thereto. The robotic cleaning apparatus 1000 may not determine the operation mode of the robotic cleaning apparatus 1000 and, in this case, the robotic cleaning apparatus 1000 may determine the cleaning target area, and the priority of and the cleaning strength for the cleaning target area considering the environment of the cleaning space, the current time, and the apparatus state of the robotic cleaning apparatus 1000. The cleaning strength may be differently set per a cleaning target area.

The robotic cleaning apparatus 1000 may determine the cleaning target area and the priority of and the cleaning strength for the cleaning target area by inputting information about the environment of the cleaning space, the current time, and the apparatus state of the robotic cleaning apparatus 1000 to a learning model for determining the cleaning target area. In this case, the learning model for determining the cleaning target area may be previously learned by the robotic cleaning apparatus 1000 or the server 2000. Alternatively, the robotic cleaning apparatus 1000 may provide the information about the environment of the cleaning space, the current time, and the apparatus state of the robotic cleaning apparatus 1000 to the server 2000, and the server 2000 may input the information about the environment of the cleaning space, the current time, and the apparatus state of the robotic cleaning apparatus 1000 to the learning model for determining the cleaning target area.

In operation S420, the robotic cleaning apparatus 1000 may perform cleaning according to the determined priority and cleaning strength. The robotic cleaning apparatus 1000 may clean the cleaning target area according to the priority of the cleaning target area at a different cleaning strength per a cleaning target area.

In operation S430, the robotic cleaning apparatus 1000 may acquire real-time contamination data while cleaning. The robotic cleaning apparatus 1000 may generate real-time contamination data by using a camera and a sensor of the robotic cleaning apparatus 1000. The robotic cleaning apparatus 1000 may receive real-time contamination data generated by the external device 3000, from the external device 3000.

In operation S440, the robotic cleaning apparatus 1000 may update the contamination map data. The robotic cleaning apparatus 1000 may update the contamination map data by reflecting the real-time contamination data acquired in operation S430. In this case, the robotic cleaning apparatus

1000 may reflect a time when the real-time contamination data is generated, to update the contamination map data.

In operation S450, the robotic cleaning apparatus 1000 may change the cleaning target area, and the priority of and the cleaning strength for the cleaning target area. The robotic cleaning apparatus 1000 may change the cleaning target area, and the priority of and the cleaning strength for the cleaning target area, which are determined in operation S410, considering the real-time contamination data acquired in operation S430.

Although the robotic cleaning apparatus 1000 uses the learning model for generating the contamination map data and the learning model for determining the cleaning target area in FIGS. 3 and 4, respectively, the disclosure is not limited thereto. The robotic cleaning apparatus 1000 may acquire data about the contamination map data and the cleaning target area by using a learning model for generating the contamination map data and determining the cleaning target area.

Figure 5:
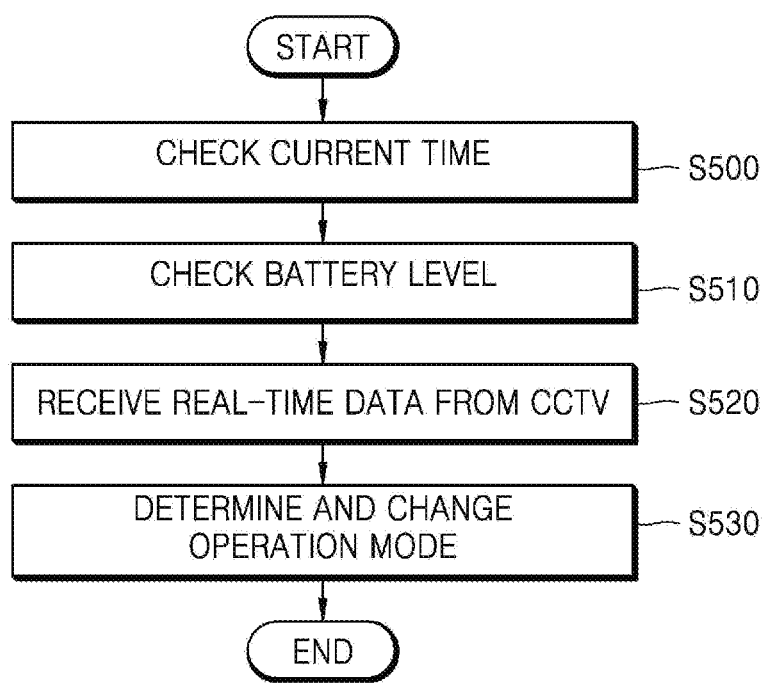
FIG. 5 is a flowchart of a method, performed by the robotic cleaning apparatus, of determining an operation mode of the robotic cleaning apparatus, according to an embodiment of the disclosure.

FIG. 5 is a flowchart of a method, performed by the robotic cleaning apparatus 1000, of determining an operation mode of the robotic cleaning apparatus 1000, according to an embodiment of the disclosure.

In operation S500, the robotic cleaning apparatus 1000 may check a current time. In operation S510, the robotic cleaning apparatus 1000 may check a battery level of the robotic cleaning apparatus 1000.

In operation S520, the robotic cleaning apparatus 1000 may receive real-time data from a CCTV in a cleaning space. When motion of a user in the cleaning space is detected, the CCTV may provide image data obtained by photographing the motion of the user, to the robotic cleaning apparatus 1000. In addition, when the motion of the user in the cleaning space is detected, the CCTV may provide information indicating that the motion of the user is detected, to the robotic cleaning apparatus 1000.

In operation S530, the robotic cleaning apparatus 1000 may determine and change an operation mode of the robotic cleaning apparatus 1000. The robotic cleaning apparatus 1000 may determine and change the operation mode of the robotic cleaning apparatus 1000 considering the current time, the battery level, and the real-time CCTV data.

For example, the robotic cleaning apparatus 1000 may determine and change the operation mode considering the current time in such a manner that the robotic cleaning apparatus 1000 operates in a low-noise mode at night. For example, the robotic cleaning apparatus 1000 may determine and change the operation mode considering the battery level in such a manner that the robotic cleaning apparatus 1000 operates in a power-saving mode when the battery level is equal to or less than a certain value. For example, when the user is present in the cleaning space, the robotic cleaning apparatus 1000 may determine and change the operation mode in such a manner that the robotic cleaning apparatus 1000 operates in a quick mode. For example, when the user is not present in the cleaning space, the robotic cleaning apparatus 1000 may determine and change the operation mode in such a manner that the robotic cleaning apparatus 1000 operates in a normal mode.

Figure 6:
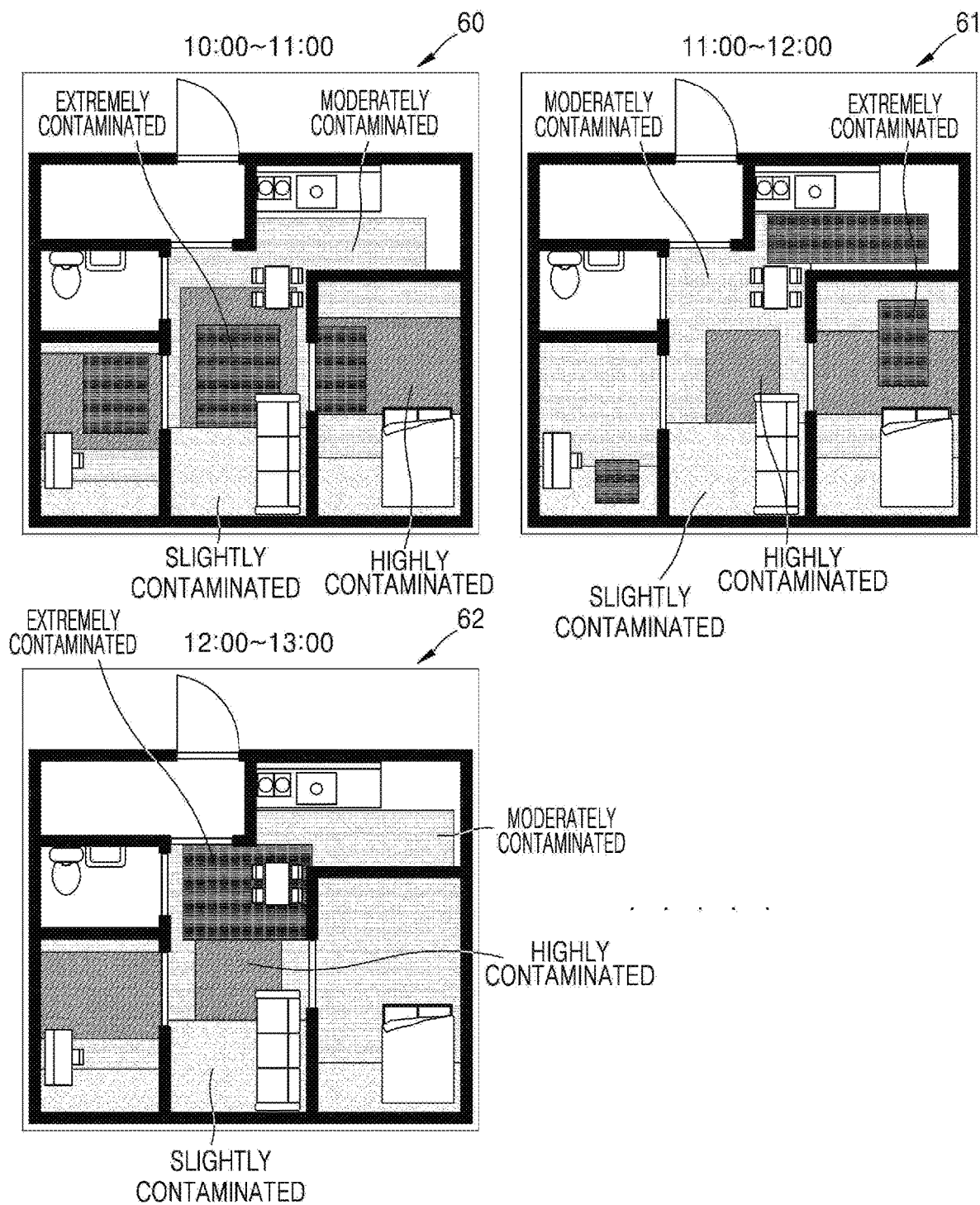
FIG. 6 is a schematic diagram showing contamination map data according to an embodiment of the disclosure.

FIG. 6 is a schematic diagram showing contamination map data according to an embodiment of the disclosure.

Referring to FIG. 6, the contamination map data may include information about a plan view of a cleaning space. For example, the cleaning space may be divided into a plurality of rooms, and the contamination map data may include information about locations of the rooms in the cleaning space, information about locations of furniture, information about locations of contaminated areas, and information about contamination levels of the contaminated areas. As indicated by reference numerals 60, 61, and 62 in FIG. 6, the contamination map data may be differently generated per a time period.

Figure 7:
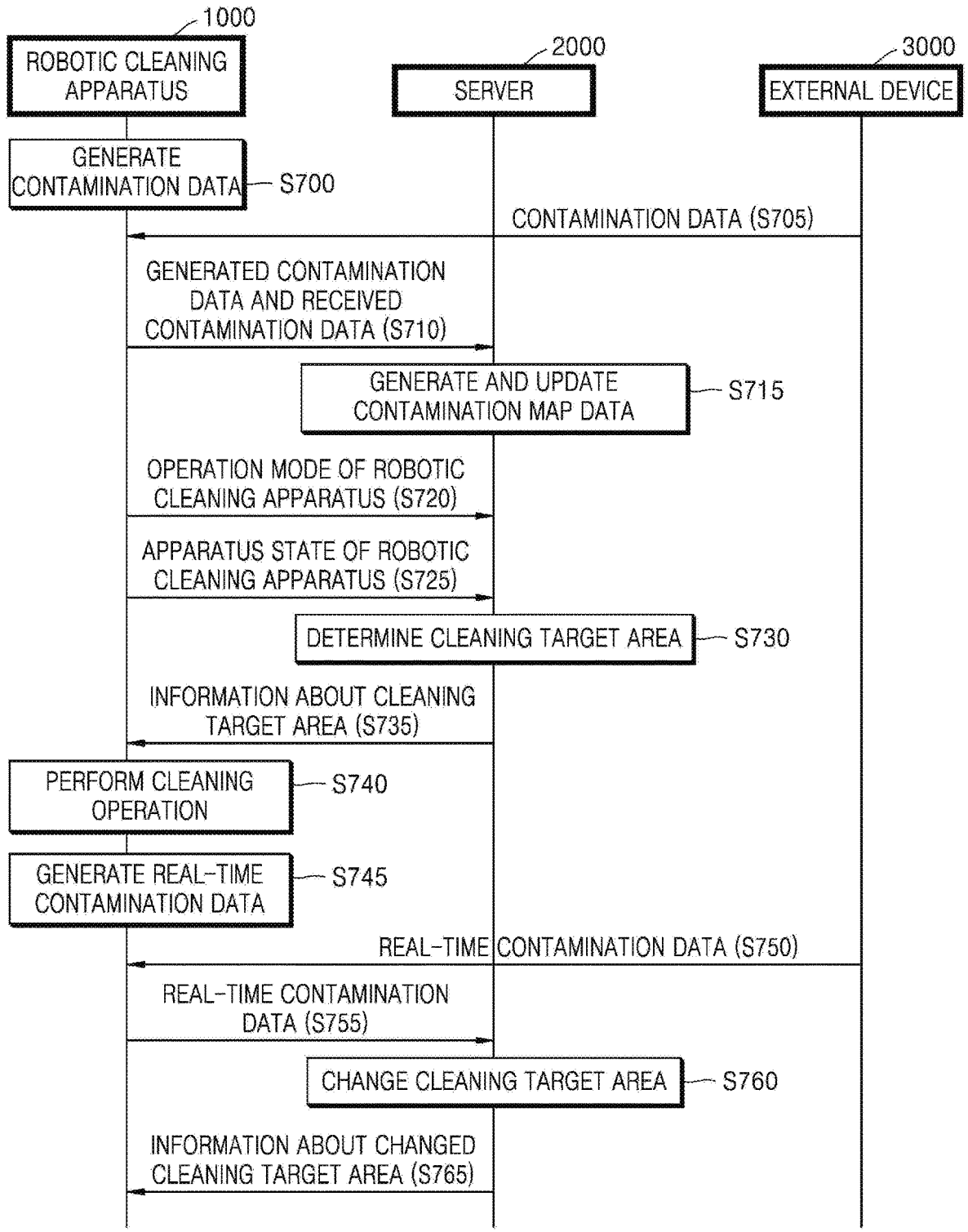
FIG. 7 is a flowchart of a method, performed by the robotic cleaning apparatus, of determining and changing a cleaning target area in association with a server, according to an embodiment of the disclosure.
Figure 8:
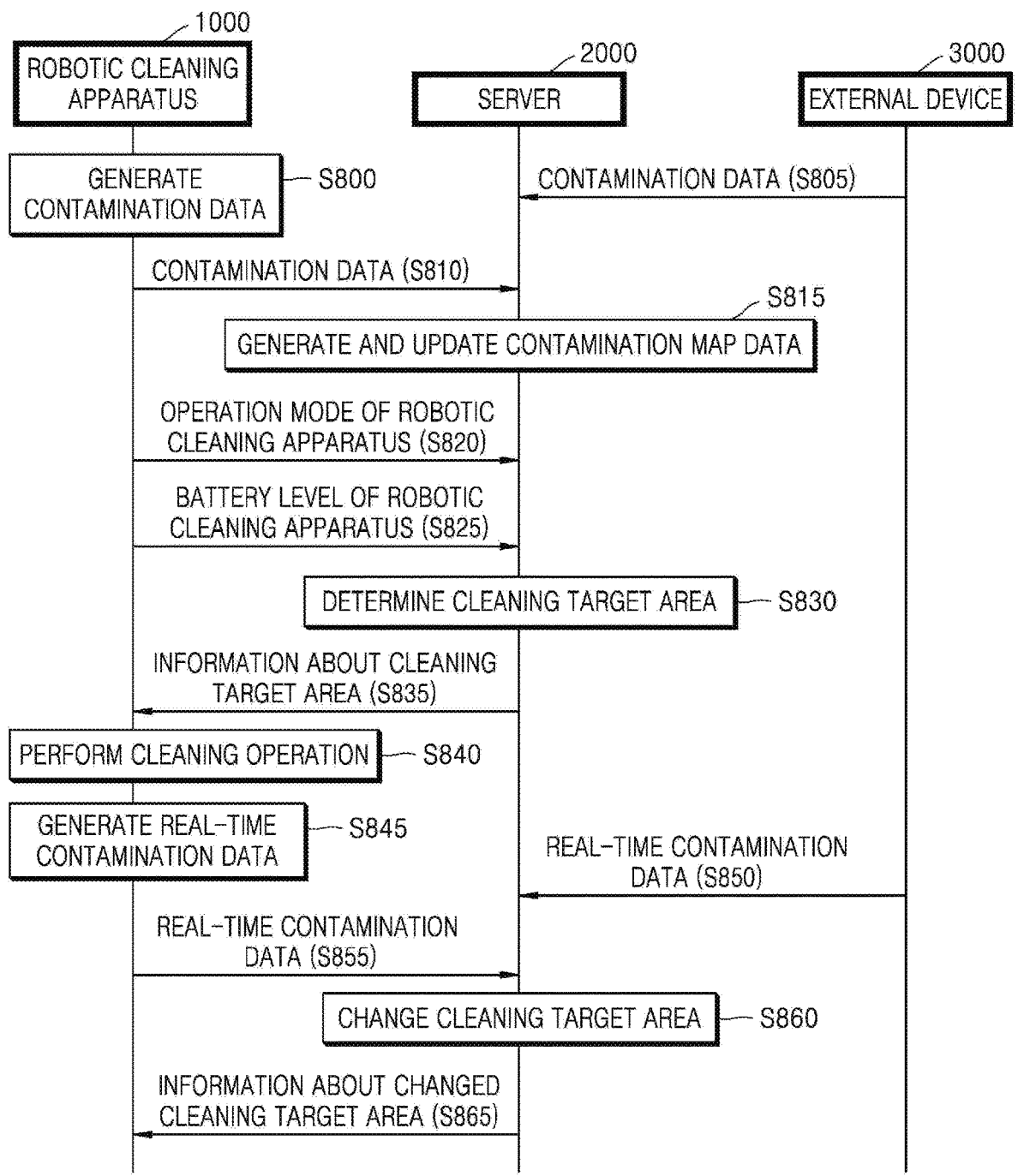
FIG. 8 is a flowchart of a method, performed by the robotic cleaning apparatus, of determining and changing a cleaning target area in association with a server, according to another embodiment of the disclosure.

FIGS. 7 and 8 are flowcharts of methods, performed by the robotic cleaning apparatus 1000, of determining and changing a cleaning target area in association with the server 2000, according to various embodiments of the disclosure.

Referring to FIG. 7, the server 2000 may determine and change a cleaning target area by acquiring contamination data from the robotic cleaning apparatus 1000.

In operation S700, the robotic cleaning apparatus 1000 may generate contamination data. In operation S705, the robotic cleaning apparatus 1000 may receive contamination data from the external device 3000.

In operation S710, the robotic cleaning apparatus 1000 may provide the generated contamination data and the received contamination data to the server 2000. The robotic cleaning apparatus 1000 may provide the generated contamination data and the received contamination data to the server 2000 in real time or periodically.

In operation S715, the server 2000 may generate and update contamination map data. The server 2000 may receive map data generated by the robotic cleaning apparatus 1000, from the robotic cleaning apparatus 1000. The server 2000 may generate the contamination map data by analyzing the received map data and contamination data. For example, the server 2000 may generate the contamination map data by applying the map data and the contamination data to a learning model for generating the contamination map data, but is not limited thereto.

The server 2000 may generate the contamination map data by using other map data and other contamination map data of another cleaning space, which are received from another robotic cleaning apparatus (not shown). In this case, the other map data of the other cleaning space, which is used by the server 2000, may be similar to the map data of the cleaning space of the robotic cleaning apparatus 1000 by a certain value or more. For example, when the other cleaning space and the cleaning space have similar space structures and similar furniture arrangements, the contamination map data of the other cleaning space may be used by the server 2000. To determine whether the other cleaning space is similar to the cleaning space, for example, the server 2000 may determine whether users in the other cleaning space are similar to users in the cleaning space of the robotic cleaning apparatus 1000. In this case, information such as occupations, ages, and genders of the users may be used to determine similarity between the users.

In operation S720, the robotic cleaning apparatus 1000 may provide information about an operation mode of the robotic cleaning apparatus 1000 to the server 2000. The robotic cleaning apparatus 1000 may determine the operation mode, based on a user input. Alternatively, the robotic cleaning apparatus 1000 may determine the operation mode considering an environment of the cleaning space and a state of the robotic cleaning apparatus 1000.

In operation S725, the robotic cleaning apparatus 1000 may provide information about an apparatus state of the robotic cleaning apparatus 1000 to the server 2000. The robotic cleaning apparatus 1000 may periodically transmit the information about the apparatus state of the robotic cleaning apparatus 1000 to the server 2000, but is not limited thereto.

In operation S730, the server 2000 may determine a cleaning target area. The server 2000 may determine a location of the cleaning target area, a priority of the cleaning target area, and a cleaning strength for the cleaning target area. The server 2000 may determine the location of the cleaning target area, the priority of the cleaning target area, and the cleaning strength for the cleaning target area considering the contamination map data, the operation mode of the robotic cleaning apparatus 1000, and the apparatus state of the robotic cleaning apparatus 1000. The cleaning strength may be determined by, for example, a speed and suction power of the robotic cleaning apparatus 1000.

The server 2000 may determine the location of the cleaning target area, the priority of the cleaning target area, and the cleaning strength for the cleaning target area by applying the contamination map data and information about the operation mode of the robotic cleaning apparatus 1000 and the apparatus state of the robotic cleaning apparatus 1000 to a learning model for determining the cleaning target area.

In operation S735, the server 2000 may provide information about the cleaning target area to the robotic cleaning apparatus 1000. In operation S740, the robotic cleaning apparatus 1000 may perform a cleaning operation. The robotic cleaning apparatus 1000 may perform cleaning, based on information about the location of the cleaning target area, the priority of the cleaning target area, and the cleaning strength for the cleaning target area, which is provided from the server 2000.

In operation S745, the robotic cleaning apparatus 1000 may generate real-time contamination data. In operation S750, the robotic cleaning apparatus 1000 may receive real-time contamination data from the external device 3000. In operation S755, the robotic cleaning apparatus 1000 may provide the generated real-time contamination data and the received real-time contamination data to the server 2000.

In operation S760, the server 2000 may change the cleaning target area, based on the real-time contamination data. The server 2000 may change the cleaning target area by applying the real-time contamination data to the learning model for determining the cleaning target area.

In operation S765, the server 2000 may provide information about the changed cleaning target area to the robotic cleaning apparatus 1000.

Referring to FIG. 8, contamination data generated by the external device 3000 (at operation S800) may be provided from the external device 3000 to the server 2000 (at operation S800).

In operation S805, the external device 3000 may provide contamination data generated by the external device 3000, to the server 2000. In operation S850, the external device 3000 may provide real-time contamination data generated by the external device 3000, to the server 2000. In this case, the server 2000 may manage the robotic cleaning apparatus 1000 and the external device 3000 together by using an integrated ID of a user. Operations S815 to S845 and S855 to S865 are akin to corresponding operations S715 to S745 and S755 to S765 shown in FIG. 7, and a detailed description thereof will be omitted. In brief, in operation S810, the robotic cleaning apparatus 1000 may provide contamination data to the server 2000, in operation S815, the server 2000 may generated and update the contamination data, in operation S820, the robotic cleaning apparatus 1000 may provide an operation mode of the robotic cleaning apparatus to the server 2000, in operation S825, the robotic cleaning apparatus 1000 may provide information related to the battery level of the robotic cleaning apparatus to the server 2000, in operation S830, the server may determine the cleaning target area based on the received information, in operation S835, the server 2000 may provide information about the cleaning target area to the robotic cleaning apparatus, in operation S840, the robotic cleaning apparatus 1000 may perform the cleaning operation of the cleaning target area, in operation S845, the robotic cleaning apparatus may generate real-time contamination data, in operation S855, the robotic cleaning apparatus 1000 provides real-time contamination data to the server 2000, in operation S860, based on the received real-time data, the server 2000 may change the cleaning target area, and in operation S865, the server 2000 may provide information about the changed cleaning target area to the robotic cleaning apparatus.

FIGS. 9, 10, 11, and 12 are schematic diagrams showing examples in which a cleaning target area is determined using learning models, according to various embodiments of the disclosure.

Figure 9:
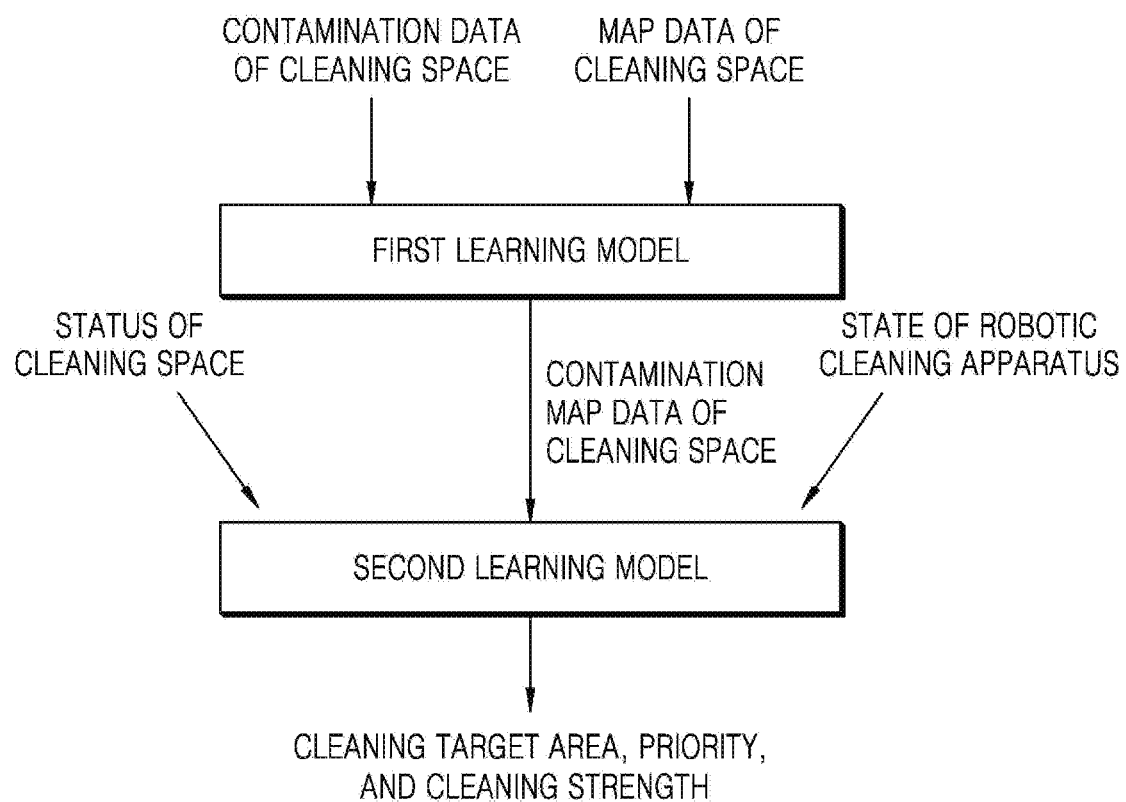
FIG. 9 is a schematic diagram showing an example in which a cleaning target area is determined using a learning model, according to an embodiment of the disclosure.

Referring to FIG. 9, for example, when contamination data of a cleaning space and map data of the cleaning space are applied to a first learning model, contamination map data of the cleaning space may be determined. In this case, the first learning model may be a learning model for generating the contamination map data of the cleaning space.

For example, when the contamination map data of the cleaning space, data about a status of the cleaning space, and data about an apparatus state of the robotic cleaning apparatus 1000 are applied to a second learning model, a cleaning target area, and a priority of and a cleaning strength for the cleaning target area may be determined. In this case, the second learning model may be a learning model for determining the cleaning target area.

Figure 10:
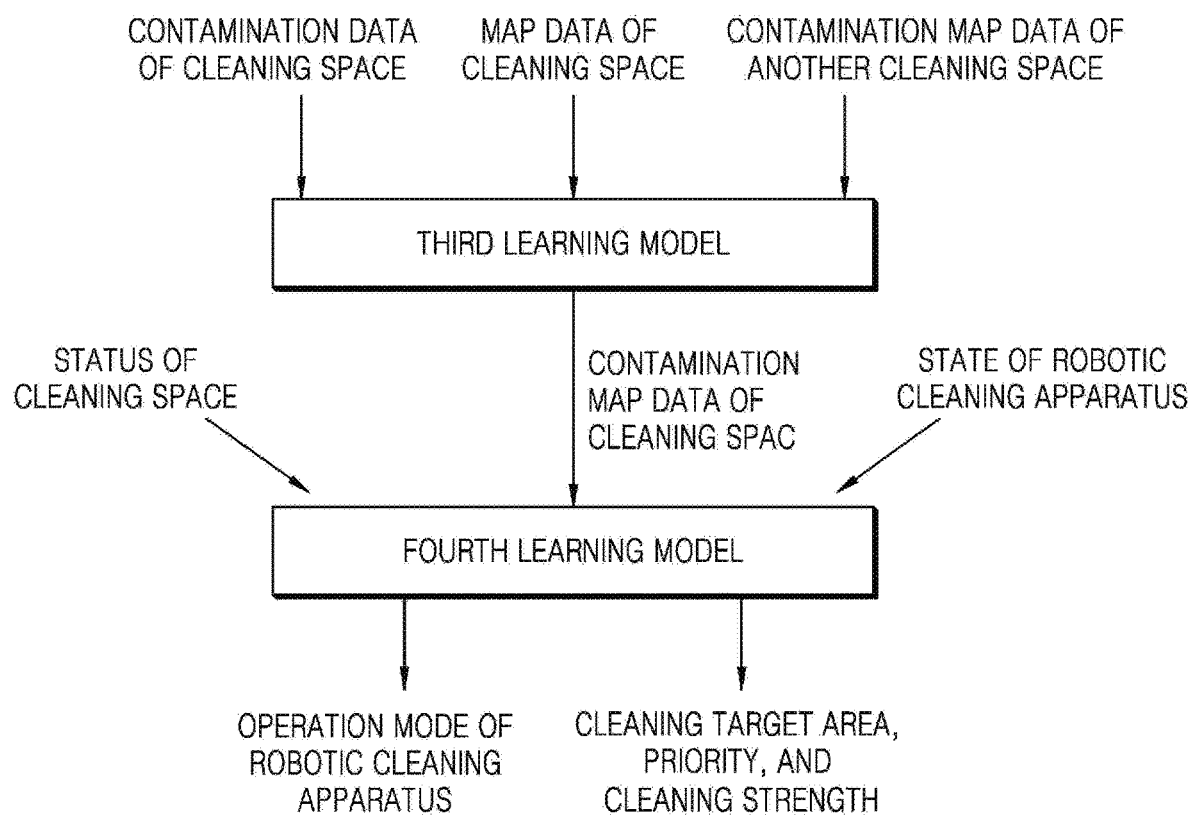
FIG. 10 is a schematic diagram showing an example in which a cleaning target area is determined using a learning model, according to another embodiment of the disclosure.

Referring to FIG. 10, for example, when contamination data of a cleaning space, map data of the cleaning space, and contamination map data of another cleaning space are applied to a third learning model, contamination map data of the cleaning space may be determined. In this case, the third learning model may be a learning model for generating the contamination map data of the cleaning space.

For example, when the contamination map data of the cleaning space, data about a status of the cleaning space, and data about an apparatus state of the robotic cleaning apparatus 1000 are applied to a fourth learning model, an operation mode of the robotic cleaning apparatus 1000, a cleaning target area, and a priority of and a cleaning strength for the cleaning target area may be determined. In this case, the fourth learning model may be a learning model for determining the operation mode of the robotic cleaning apparatus 1000 and the cleaning target area.

Figure 11:
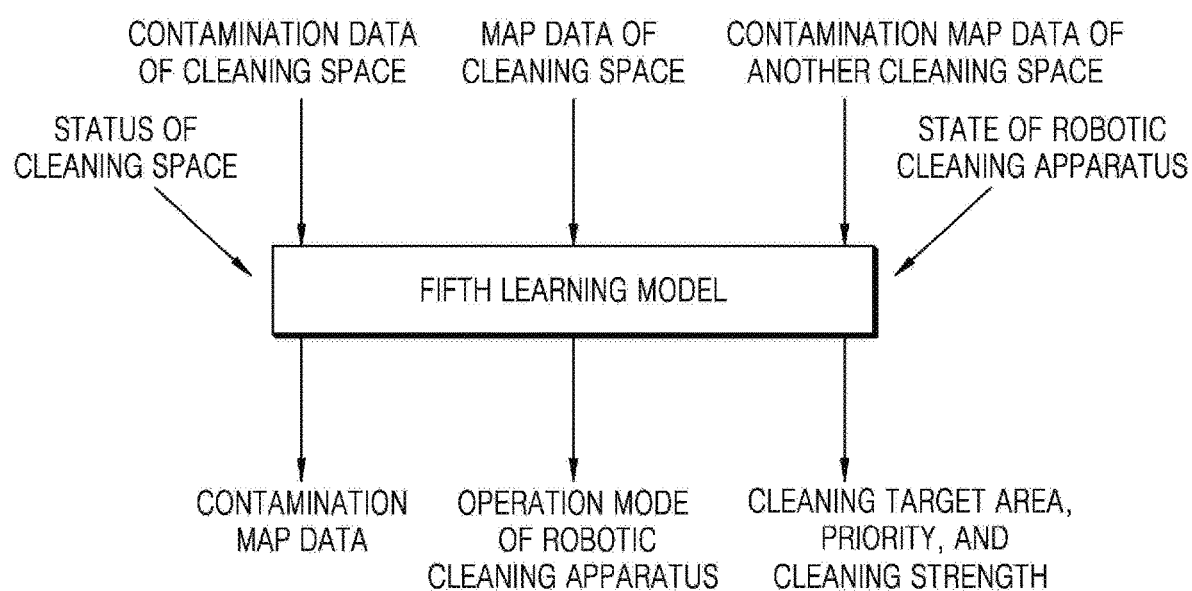
FIG. 11 is a schematic diagram showing an example in which a cleaning target area is determined using a learning model, according to another embodiment of the disclosure.

Referring to FIG. 11, for example, when contamination data of a cleaning space, map data of the cleaning space, contamination map data of another cleaning space, data about a status of the cleaning space, and data about an apparatus state of the robotic cleaning apparatus 1000 are applied to a fifth learning model, contamination map data of the cleaning space, an operation mode of the robotic cleaning apparatus 1000, a cleaning target area, and a priority of and a cleaning strength for the cleaning target area may be determined. In this case, the fifth learning model may be a learning model for determining the contamination map data of the cleaning space, the operation mode of the robotic cleaning apparatus 1000, and the cleaning target area.

Figure 12:
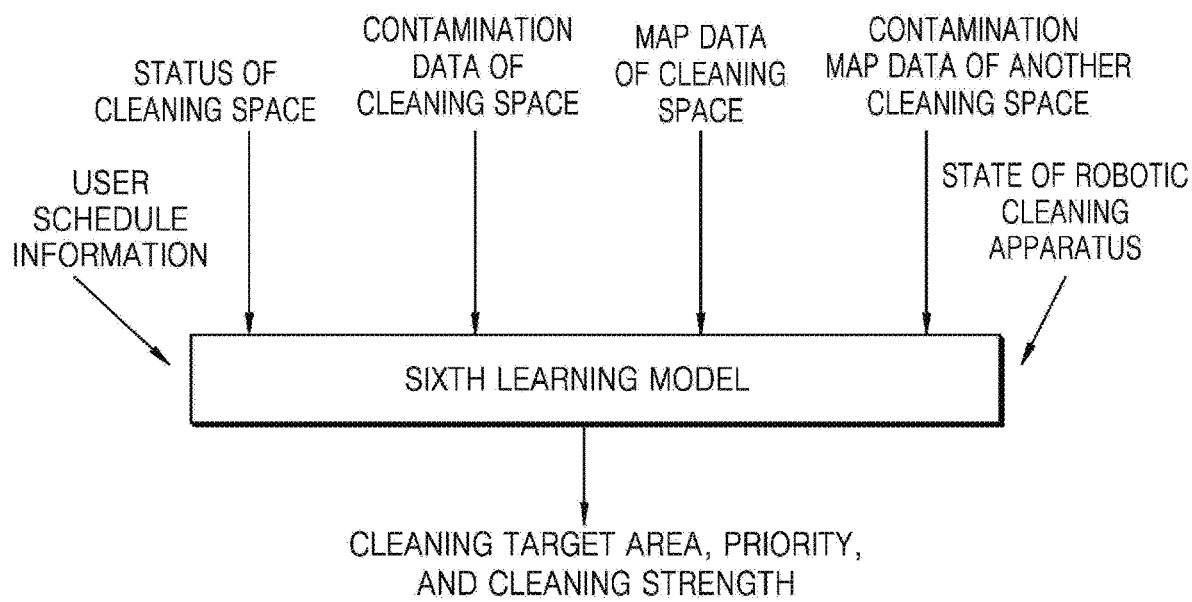
FIG. 12 is a schematic diagram showing an example in which a cleaning target area is determined using a learning model, according to another embodiment of the disclosure.

Referring to FIG. 12, for example, when contamination data of a cleaning space, map data of the cleaning space, contamination map data of another cleaning space, data about a status of the cleaning space, data about an apparatus state of the robotic cleaning apparatus 1000, and schedule information of a user are applied to a sixth learning model, a cleaning target area, and a priority of and a cleaning strength for the cleaning target area may be determined. In this case, the sixth learning model may be a learning model for determining the cleaning target area.

Although the contamination map data of the cleaning space, the operation mode of the robotic cleaning apparatus 1000, and the cleaning target area are determined using various types of learning models in FIGS. 9 to 12, the disclosure is not limited thereto. Learning models different in types and numbers from those illustrated in FIGS. 9 to 12 may be used to determine the contamination map data of the cleaning space, the operation mode of the robotic cleaning apparatus 1000, and the cleaning target area. Different and various types of information may be input to the learning models.

FIG. 13 is a table for describing operation modes of the robotic cleaning apparatus 1000, according to an embodiment of the disclosure.

Referring to FIG. 13, the operation modes of the robotic cleaning apparatus 1000 may include, for example, a normal mode, a quick mode, a low-noise mode, and a power-saving mode. The normal mode may be an operation mode for normal cleaning.

The quick mode may be an operation mode for quick cleaning. In the quick mode, the robotic cleaning apparatus 1000 may clean only a contaminated area having a contamination level equal to or greater than a certain value, with high suction power while moving at a high speed. When an operating time is set by a user, the robotic cleaning apparatus 1000 may determine a cleaning target area to quickly complete cleaning within the set operating time.

The low-noise mode may be an operation mode for minimizing noise. When a user is present in a cleaning space or at night, the robotic cleaning apparatus 1000 may perform cleaning in the low-noise mode. In this case, the robotic cleaning apparatus 1000 may perform cleaning with low suction power while moving at a low speed.

The power-saving mode may be an operation mode for reducing battery consumption. When the robotic cleaning apparatus 1000 has a low battery level, the robotic cleaning apparatus 1000 may operate with a low power consumption and determine a cleaning target area considering the battery level.

The above-described operation modes of the robotic cleaning apparatus 1000 are merely examples, and the operation modes of the robotic cleaning apparatus 1000 are not limited thereto. The robotic cleaning apparatus 1000 may operate in operation modes different from the above-described operation modes and perform cleaning by using a combination of two or more operation modes. The operation mode of the robotic cleaning apparatus 1000 may not be set in a simple manner. For example, the robotic cleaning apparatus 1000 may operate by continuously setting and changing weights for quick cleaning, low-noise cleaning, and save cleaning.

Figure 14:
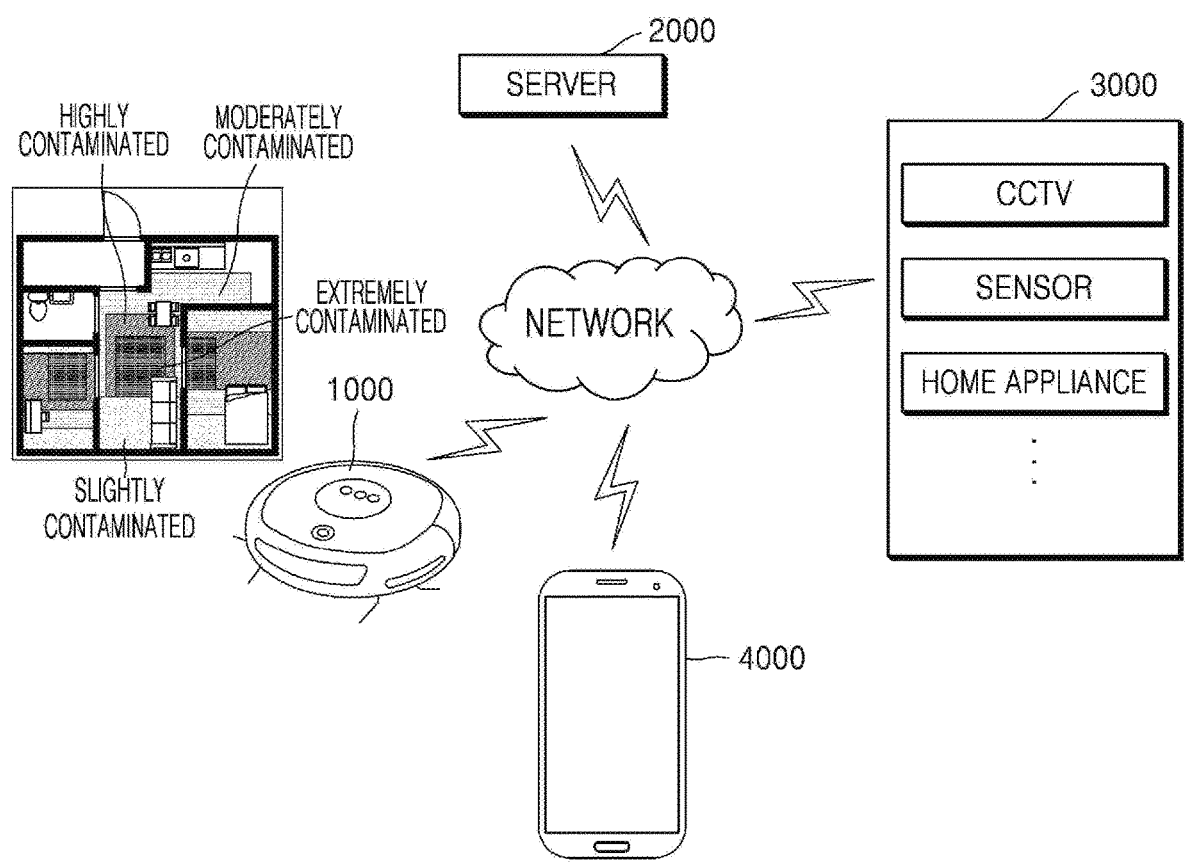
FIG. 14 is a schematic diagram of a cleaning system according to another embodiment of the disclosure.

FIG. 14 is a schematic diagram of a cleaning system according to another embodiment of the disclosure.

Referring to FIG. 14, the cleaning system according to another embodiment of the disclosure may include the robotic cleaning apparatus 1000, the server 2000, at least one external device 3000, and a mobile device 4000.

The mobile device 4000 may communicate with the robotic cleaning apparatus 1000, the server 2000, and the at least one external device 3000 through a network. The mobile device 4000 may perform some of the functions of the robotic cleaning apparatus 1000, which are described above in relation to FIGS. 1 to 13. For example, the mobile device 4000 may display a graphical user interface (GUI) for controlling the robotic cleaning apparatus 1000, and a map showing a contamination level of a cleaning space, on a screen of the mobile device 4000. For example, the mobile device 4000 may receive information about a state of the robotic cleaning apparatus 1000 and a status of the cleaning space from the robotic cleaning apparatus 1000, and use a learning model to determine how to clean the cleaning space. The mobile device 4000 may use at least one learning model to generate contamination map data and determine a cleaning target area. In this case, the mobile device 4000 may perform operations of the robotic cleaning apparatus 1000, as described below with reference to FIGS. 20 to 23.

The mobile device 4000 may include, for example, a display (not shown), a communication interface (not shown) used to communicate with an external device, a memory (not shown) storing one or more instructions, at least one sensor (not shown), and a processor (not shown) executing the instructions stored in the memory. The processor of the mobile device 4000 may control operations of the other elements of the mobile device 4000 by executing the instructions stored in the memory.

Figure 15:
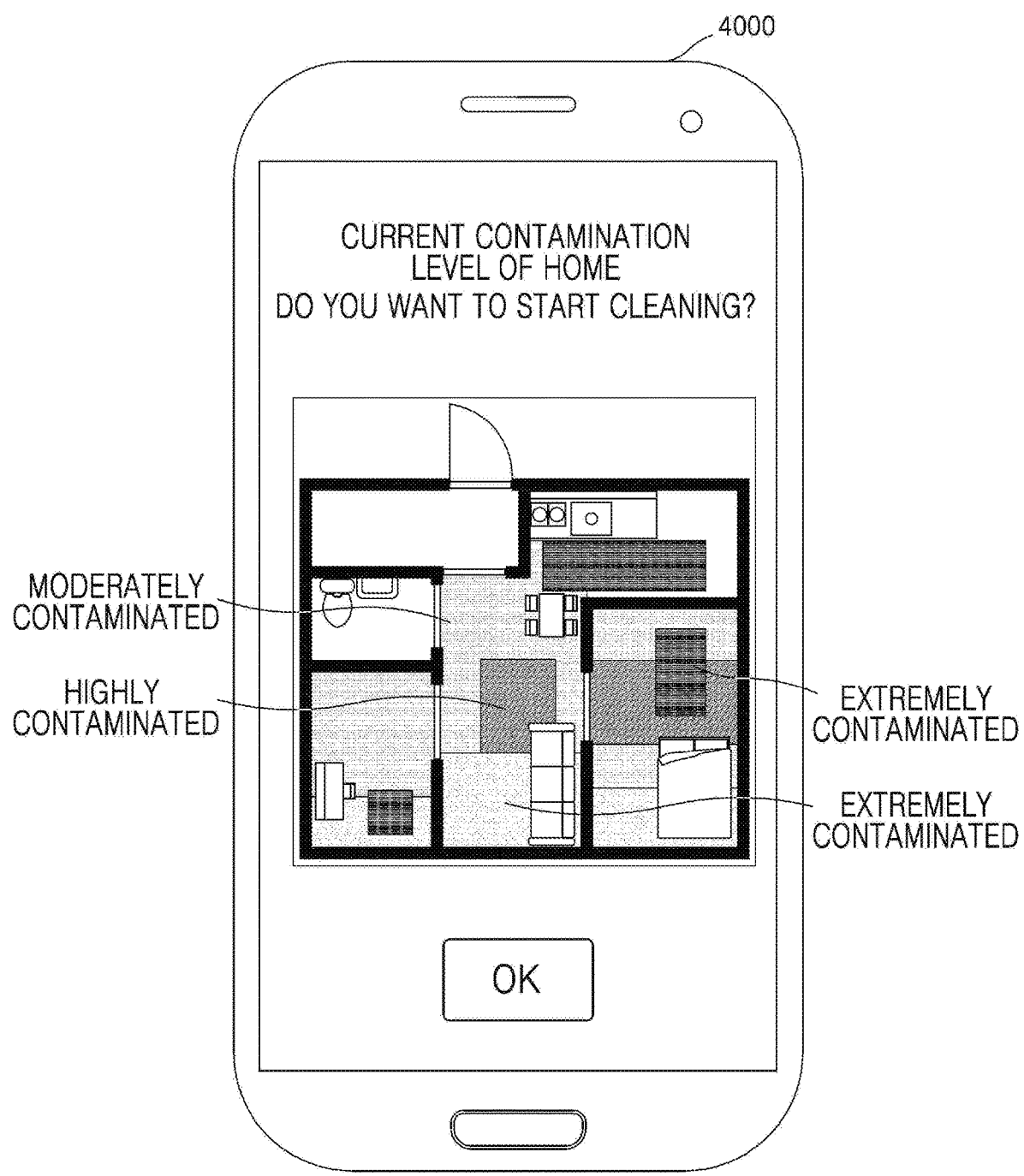
FIGS. 15, 16, and 17 are schematic diagrams showing an example in which a mobile device controls the robotic cleaning apparatus to operate in a certain operation mode, according to an embodiment of the disclosure.
Figure 16:
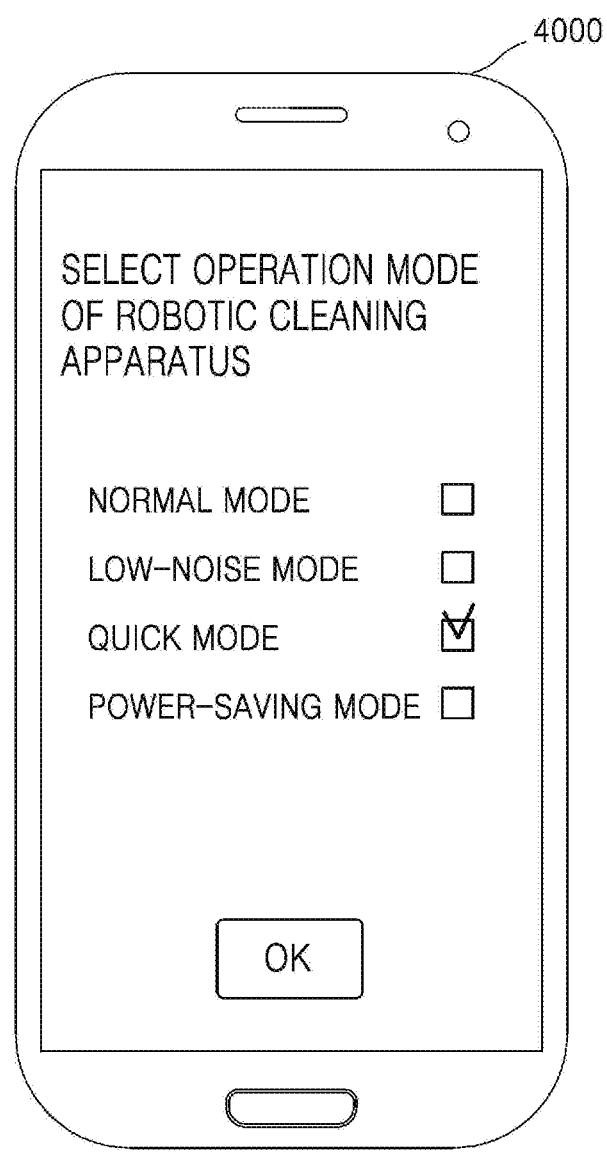
Figure 17:
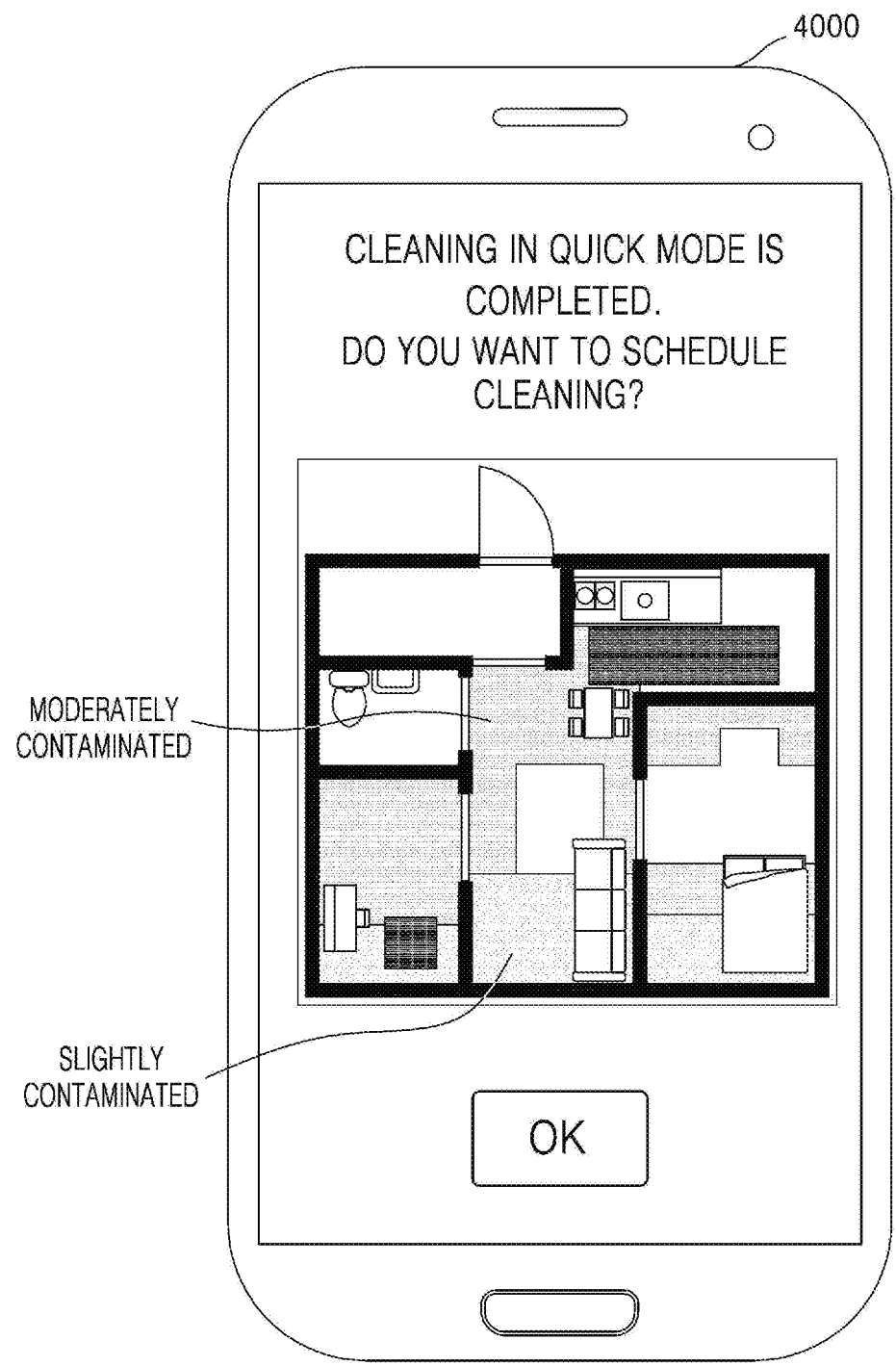

FIGS. 15 to 17 are schematic diagrams showing an example in which the mobile device 4000 controls the robotic cleaning apparatus 1000 to operate in a certain operation mode, according to an embodiment of the disclosure.

Referring to FIG. 15, the mobile device 4000 may receive contamination map data from the robotic cleaning apparatus 1000 and display the received contamination map data on a screen of the mobile device 4000. For example, the mobile device 4000 may display the contamination map data indicating a current contamination level of a home, and a GUI for determining whether to start cleaning by using the robotic cleaning apparatus 1000, on the screen.

Referring to FIG. 16, the mobile device 4000 may display a GUI for selecting an operation mode of the robotic cleaning apparatus 1000, on the screen. The mobile device 4000 may display a list of operation modes of the robotic cleaning apparatus 1000. For example, the mobile device 4000 may display an operation mode list including a normal mode, a low-noise mode, a quick mode, and a power-saving mode, and receive a user input for selecting the quick mode. The mobile device 4000 may request the robotic cleaning apparatus 1000 to perform cleaning in the quick mode.

Referring to FIG. 17, the mobile device 4000 may display a GUI showing a result of cleaning performed using the robotic cleaning apparatus 1000. For example, the robotic cleaning apparatus 1000 may clean a cleaning space in the quick mode according to the request of the mobile device 4000. For example, the robotic cleaning apparatus 1000 may clean an extremely contaminated area and a highly contaminated area of the cleaning space in the quick mode and provide contamination map data indicating a result of cleaning, to the mobile device 4000. As such, the mobile device 4000 may display the contamination map data indicating the result of cleaning. The mobile device 4000 may display a GUI for determining whether to schedule a cleaning using the robotic cleaning apparatus 1000.

Figure 18:
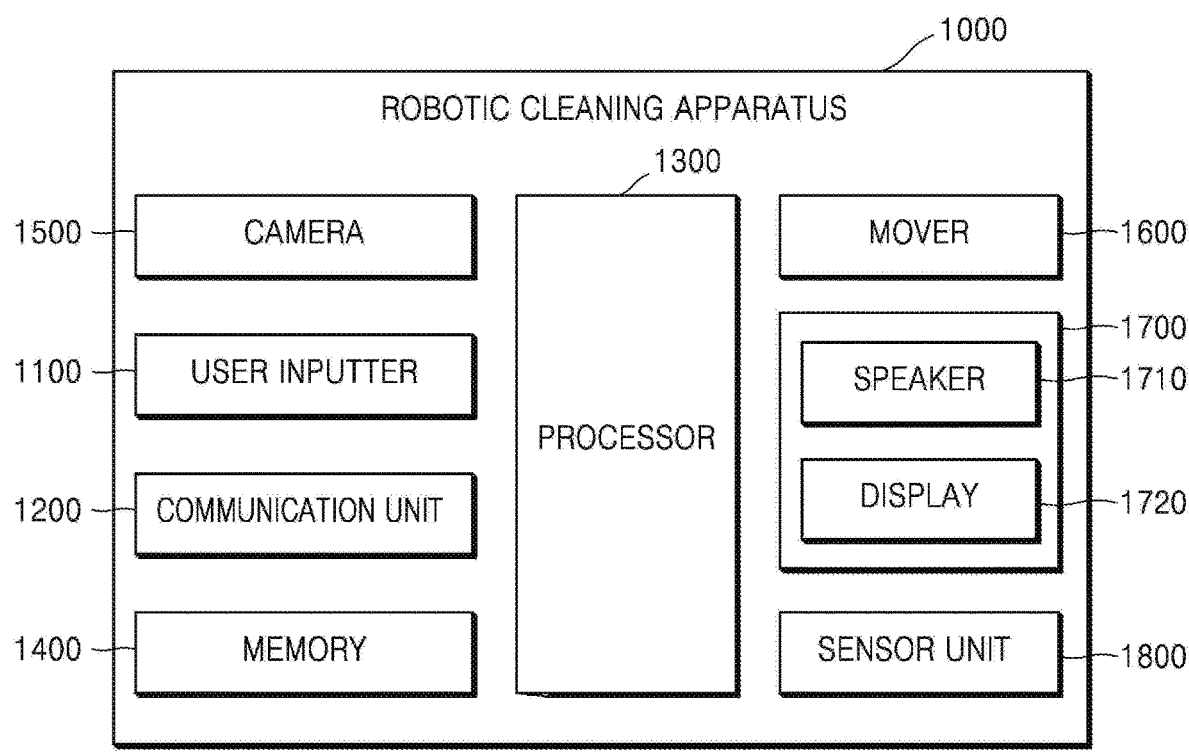
FIG. 18 is a block diagram of the robotic cleaning apparatus according to an embodiment of the disclosure.

FIG. 18 is a block diagram of the robotic cleaning apparatus 1000 according to an embodiment of the disclosure.

Referring to FIG. 18, the robotic cleaning apparatus 1000 according to an embodiment of the disclosure may include a user inputter 1100, a communication unit 1200, a memory 1400, a camera 1500, a mover 1600, an outputter 1700, a sensor unit 1800, and a processor 1300, and the outputter 1700 may include a speaker 1710 and a display 1720.

The user inputter 1100 may receive user inputs for controlling operations of the robotic cleaning apparatus 1000. For example, the user inputter 1100 may include, for example, a key pad, a dome switch, a touchpad (e.g., a capacitive overlay, resistive overlay, infrared beam, surface acoustic wave, integral strain gauge, or piezoelectric touchpad), a jog wheel, and a jog switch, but is not limited thereto.

The communication unit 1200 may include one or more communication modules for communicating with the server 2000 and the external device 3000. For example, the communication unit 1200 may include a short-range wireless communication unit and a mobile communication unit. The short-range wireless communication unit may include, for example, a Bluetooth communication unit, a BLE communication unit, an NFC unit, a WLAN (or Wi-Fi) communication unit, a Zigbee communication unit, an IrDA communication unit, a WFD communication unit, a UWB communication unit, or an Ant+ communication unit, but is not limited thereto. The mobile communication unit transmits and receives radio signals to and from at least one of a base station, an external terminal, or a server in a mobile communication network. Herein, the radio signals may include voice call signals, video call signals, or various types of data due to transception of text/multimedia messages.

The memory 1400 may store programs for controlling operations of the robotic cleaning apparatus 1000. The memory 1400 may include at least one instruction for controlling operations of the robotic cleaning apparatus 1000. The memory 1400 may store, for example, map data, contamination data, contamination map data, and data about a cleaning target area. The memory 1400 may store, for example, a learning model for generating the contamination map data, and a learning model for determining the cleaning target area. The programs stored in the memory 1400 may be classified into a plurality of modules according to functions thereof.

The memory 1400 may include at least one type of storage medium among flash memory, a hard disk, a multimedia card micro, card-type memory (e.g., secure digital (SD) or extreme digital (XD) memory), random access memory (RANI), static random access memory (SRAM), read-only memory (ROM), electrically erasable programmable ROM (EEPROM), programmable ROM (PROM), magnetic memory, a magnetic disc, and an optical disc.

The camera 1500 may photograph an ambient environment of the robotic cleaning apparatus 1000. The camera 1500 may photograph the ambient environment of the robotic cleaning apparatus 1000 or a floor while the robotic cleaning apparatus 1000 is performing cleaning.

The mover 1600 may include at least one driving wheel for moving the robotic cleaning apparatus 1000. The mover 1600 may include a driving motor connected to the driving wheel to rotate the driving wheel. The driving wheel may include a left wheel and a right wheel respectively provided at a left side and a right side of a main body of the robotic cleaning apparatus 1000. The left and right wheels may be driven by a single driving motor, or a left wheel driving motor for driving the left wheel and a right wheel driving motor for driving the right wheel may be separately used when needed. In this case, the robotic cleaning apparatus 1000 may be steered to a left side or a right side by rotating the left and right wheels at different speeds.

The outputter 1700 may output an audio signal or a video signal. The outputter 1700 may include the speaker 1710 and the display 1720. The speaker 1710 may output audio data received from the communication unit 1200 or stored in the memory 1400. The speaker 1710 may output a sound signal (e.g., call signal reception sound, message reception sound, or notification sound) related to a function performed by the robotic cleaning apparatus 1000.

The display 1720 displays information processed by the robotic cleaning apparatus 1000. For example, the display 1720 may display a user interface for controlling the robotic cleaning apparatus 1000 or a user interface indicating a state of the robotic cleaning apparatus 1000.

When the display 1720 and a touchpad are layered to configure a touchscreen, the display 1720 may be used not only as an output device but also as an input device.

The sensor unit 1800 may include at least one sensor for sensing data about an operation and a state of the robotic cleaning apparatus 1000, and data about contamination of a cleaning space. The sensor unit 1800 may include, for example, at least one of an infrared sensor, an ultrasonic sensor, an RF sensor, a geomagnetic sensor, or a PSD sensor.

The sensor unit 1800 may detect a contaminated area near the robotic cleaning apparatus 1000 and detect a contamination level. The sensor unit 1800 may detect an obstacle near the robotic cleaning apparatus 1000, or detect whether a cliff is present near the robotic cleaning apparatus 1000.

The sensor unit 1800 may further include an operation detection sensor for detecting operations of the robotic cleaning apparatus 1000. For example, the sensor unit 1800 may include a gyro sensor, a wheel sensor, and an acceleration sensor.

The gyro sensor may detect a rotation direction and a rotation angle when the robotic cleaning apparatus 1000 moves. The wheel sensor may be connected to the left and right wheels to detect the number of revolutions of each wheel. For example, the wheel sensor may be a rotary encoder but is not limited thereto.

The processor 1300 may generally control overall operations of the robotic cleaning apparatus 1000. For example, the processor 1300 may control the user inputter 1100, the communication unit 1200, the memory 1400, the camera 1500, the mover 1600, the outputter 1700, and the sensor unit 1800 by executing the programs stored in the memory 1400. The processor 1300 may control the operations of the robotic cleaning apparatus 1000, which are described above in relation to FIGS. 1 to 13, by controlling the user inputter 1100, the communication unit 1200, the memory 1400, the camera 1500, the mover 1600, the outputter 1700, and the sensor unit 1800.

The processor 1300 may acquire contamination data. The processor 1300 may generate contamination data of the cleaning space by using a camera and a sensor of the robotic cleaning apparatus 1000. The processor 1300 may generate image data indicating a contamination level of the cleaning space, by photographing the cleaning space with the camera while cleaning the cleaning space. The processor 1300 may generate sensing data indicating a dust quantity in the cleaning space, by sensing the cleaning space through a dust sensor while cleaning the cleaning space.

The processor 1300 may receive contamination data from the external device 3000. The external device 3000 may provide the contamination data generated by the external device 3000, to the server 2000, and the processor 1300 may receive the contamination data generated by the external device 3000, from the server 2000.

The processor 1300 may acquire contamination map data based on the contamination data. The processor 1300 may generate and update the contamination map data by using the acquired contamination data. The contamination map data may include a map of the cleaning space and information indicating locations and contamination levels of contaminated areas in the cleaning space. The contamination map data may be generated per a time period and indicate the locations and the contamination levels of the contaminated areas in the cleaning space, in each time period.

The processor 1300 may generate map data of the cleaning space by recognizing a location of the robotic cleaning apparatus 1000 while moving. The processor 1300 may generate the contamination map data indicating the contaminated areas in the cleaning space, by using the contamination data and the map data.

The processor 1300 may generate the contamination map data by, for example, applying the map data and the contamination data of the cleaning space to the learning model for generating the contamination map data.

Alternatively, the processor 1300 may request the contamination map data from the server 2000. In this case, the processor 1300 may provide the map data and the contamination data of the cleaning space to the server 2000, and the server 2000 may generate the contamination map data by applying the map data and the contamination data of the cleaning space to the learning model for generating the contamination map data.

The processor 1300 may determine a cleaning target area, based on the contamination map data. The processor 1300 may predict the locations and the contamination levels of the contaminated areas in the cleaning space, based on the contamination map data, and determine at least one cleaning target area, based on an operation mode and an apparatus state of the robotic cleaning apparatus 1000.

The processor 1300 may determine a priority of and a cleaning strength for the cleaning target area in the cleaning space considering the operation mode and the apparatus state of the robotic cleaning apparatus 1000. The processor 1300 may determine the cleaning strength of the robotic cleaning apparatus 1000 by, for example, determining a speed and suction power of the robotic cleaning apparatus 1000.

The processor 1300 may determine the cleaning target area by applying information about the robotic cleaning apparatus 1000 and the cleaning space to the learning model for determining the cleaning target area. For example, the processor 1300 may determine the cleaning target area, and the priority of and the cleaning strength for the cleaning target area by inputting information about the operation mode of the robotic cleaning apparatus 1000, the apparatus state of the robotic cleaning apparatus 1000, and a motion of a user in the cleaning space, to the learning model for determining the cleaning target area.

The processor 1300 may clean the determined cleaning target area. The processor 1300 may clean the cleaning space according to the priority of and the cleaning strength for the cleaning target area. The processor 1300 may collect contamination data about contamination of the cleaning space in real time while cleaning, and change the cleaning target area by reflecting the contamination data collected in real time.

Figure 19:
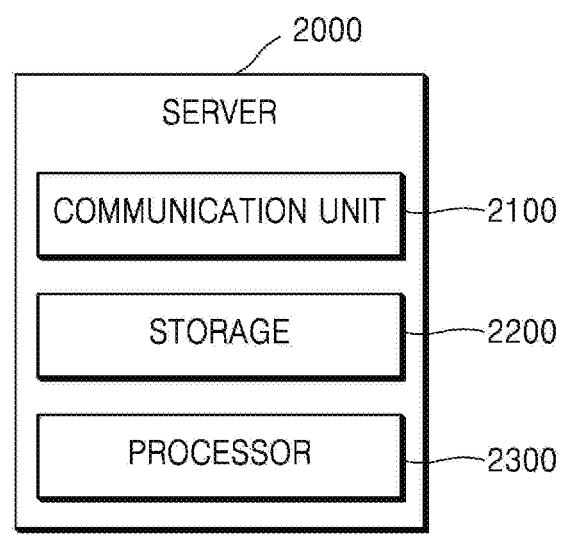
FIG. 19 is a block diagram of the server according to an embodiment of the disclosure.

FIG. 19 is a block diagram of the server 2000 according to an embodiment of the disclosure.

Referring to FIG. 19, the server 2000 according to an embodiment of the disclosure may include a communication unit 2100, a storage 2200, and a processor 2300.

The communication unit 2100 may include one or more communication modules for communicating with the robotic cleaning apparatus 1000 and the external device 3000. For example, the communication unit 2100 may include a short-range wireless communication unit and a mobile communication unit. The short-range wireless communication unit may include, for example, a Bluetooth communication unit, a BLE communication unit, an NFC unit, a WLAN (or Wi-Fi) communication unit, a Zigbee communication unit, an IrDA communication unit, a WFD communication unit, a UWB communication unit, or an Ant+communication unit, but is not limited thereto. The mobile communication unit transmits and receives radio signals to and from at least one of a base station, an external terminal, or a server in a mobile communication network. Herein, the radio signals may include voice call signals, video call signals, or various types of data due to transception of text/multimedia messages.

The storage 2200 may store programs for controlling operations of the server 2000. The storage 2200 may include at least one instruction for controlling operations of the server 2000. The storage 2200 may store, for example, map data, contamination data, contamination map data, and data about a cleaning target area. The storage 2200 may store, for example, a learning model for generating the contamination map data, and a learning model for determining the cleaning target area. The programs stored in the storage 2200 may be classified into a plurality of modules according to functions thereof.

The storage 2200 may include a plurality of databases (DBs) to comprehensively manage, for example, user identifiers (IDs) of a plurality of users, contamination map data of a plurality of robotic cleaning apparatuses, and sensing data of a plurality of external devices.

The processor 2300 may generally control overall operations of the server 2000. For example, the processor 2300 may control the communication unit 2100 and the storage 2200 by executing the programs stored in the storage 2200. The processor 2300 may control the operations of the server 2000, which are described above in relation to FIGS. 1 to 13, by controlling the communication unit 2100 and the storage 2200.

The processor 2300 may receive contamination data from at least one of the robotic cleaning apparatus 1000 or the external device 3000. The processor 2300 may receive the contamination data from at least one of the robotic cleaning apparatus 1000 or the external device 3000 in real time or periodically.

The processor 2300 may generate and update contamination map data. The processor 2300 may receive map data generated by the robotic cleaning apparatus 1000, from the robotic cleaning apparatus 1000. The processor 2300 may generate the contamination map data by analyzing the received map data and contamination data. For example, the processor 2300 may generate the contamination map data by applying the map data and the contamination data to the learning model for generating the contamination map data, but is not limited thereto.

The processor 2300 may generate the contamination map data by using other map data and other contamination map data of another cleaning space, which are received from another robotic cleaning apparatus (not shown). In this case, the other map data of the other cleaning space, which is used by the processor 2300, may be similar to the map data of the cleaning space of the robotic cleaning apparatus 1000 by a certain value or more. For example, when the other cleaning space and the cleaning space have similar space structures and similar furniture arrangements, the contamination map data of the other cleaning space may be used by the processor 2300. To determine whether the other cleaning space is similar to the cleaning space, for example, the processor 2300 may determine whether users in the other cleaning space are similar to users in the cleaning space of the robotic cleaning apparatus 1000. In this case, information such as occupations, ages, and genders of the users may be used to determine similarity between the users.

The processor 2300 may receive information about an operation mode of the robotic cleaning apparatus 1000 from the robotic cleaning apparatus 1000. The processor 2300 may receive information about an apparatus state of the robotic cleaning apparatus 1000 from the robotic cleaning apparatus 1000.

The processor 2300 may determine a cleaning target area. The processor 2300 may determine a location of the cleaning target area, a priority of the cleaning target area, and a cleaning strength for the cleaning target area. The processor 2300 may determine the location of the cleaning target area, the priority of the cleaning target area, and the cleaning strength for the cleaning target area considering the contamination map data, the operation mode of the robotic cleaning apparatus 1000, and the apparatus state of the robotic cleaning apparatus 1000. The cleaning strength may be determined by, for example, a speed and suction power of the robotic cleaning apparatus 1000.

The processor 2300 may determine the location of the cleaning target area, the priority of the cleaning target area, and the cleaning strength for the cleaning target area by applying the contamination map data and information about the operation mode of the robotic cleaning apparatus 1000 and the apparatus state of the robotic cleaning apparatus 1000 to the learning model for determining the cleaning target area.

The processor 2300 may receive real-time contamination data from at least one of the robotic cleaning apparatus 1000 or the external device 3000. The processor 2300 may change the cleaning target area, based on the real-time contamination data. The processor 2300 may change the cleaning target area by applying the real-time contamination data to the learning model for determining the cleaning target area. The processor 2300 may provide information about the changed cleaning target area to the robotic cleaning apparatus 1000.

The processor 2300 may manage the robotic cleaning apparatus 1000 and the external device 3000 together by using an integrated ID of a user.

Figure 20:
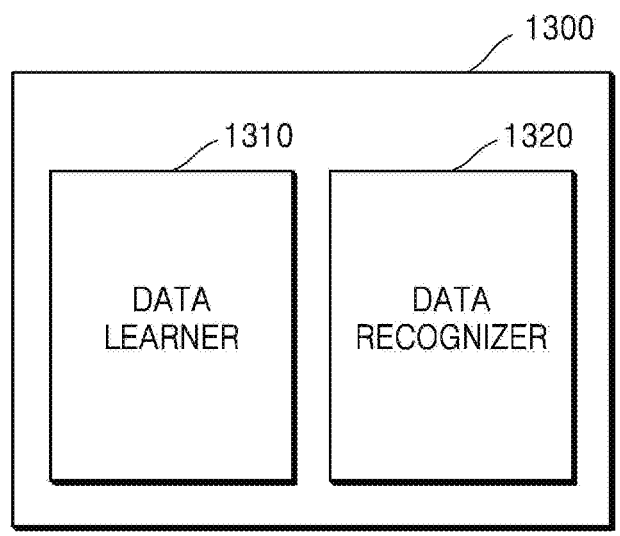
FIG. 20 is a block diagram of a processor according to an embodiment of the disclosure.

FIG. 20 is a block diagram of the processor 1300 according to an embodiment of the disclosure.

Referring to FIG. 20, the processor 1300 according to an embodiment of the disclosure may include a data learner 1310 and a data recognizer 1320.

The data learner 1310 may learn criteria for at least one of generation of contamination map data, determination of a cleaning target area, or determination of an operation mode of the robotic cleaning apparatus 1000. The data learner 1310 may learn which data is used for decision of at least one of the generation of the contamination map data, the determination of the cleaning target area, or the determination of the operation mode of the robotic cleaning apparatus 1000, and learn criteria about how to decide at least one of the generation of the contamination map data, the determination of the cleaning target area, or the determination of the operation mode of the robotic cleaning apparatus 1000 by using the data. The data learner 1310 may learn the criteria for at least one of the generation of the contamination map data, the determination of the cleaning target area, or the determination of the operation mode of the robotic cleaning apparatus 1000 by acquiring data to be used for learning and applying the acquired data to a data recognition model to be described below.

The data recognizer 1320 may decide at least one of the generation of the contamination map data, the determination of the cleaning target area, or the determination of the operation mode of the robotic cleaning apparatus 1000, based on data. The data recognizer 1320 may perform at least one of the generation of the contamination map data, the determination of the cleaning target area, or the determination of the operation mode of the robotic cleaning apparatus 1000 by using certain data and a learned data recognition model. The data recognizer 1320 may perform at least one of the generation of the contamination map data, the determination of the cleaning target area, or the determination of the operation mode of the robotic cleaning apparatus 1000 by acquiring the certain data according to the learned preset criteria and using the acquired data as an input value of the data recognition model. A resultant value output from the data recognition model by using the acquired data as an input value may be used to update the data recognition model.

At least one of the data learner 1310 or the data recognizer 1320 may be produced in the form of at least one hardware chip and be mounted in an electronic apparatus. For example, at least one of the data learner 1310 or the data recognizer 1320 may be produced in the form of an exclusive hardware chip for artificial intelligence (AI), or as a part of a general-use processor (e.g., a central processing unit (CPU) or an application processor) or a dedicated graphics processor (e.g., a graphics processing unit (GPU)), and be mounted in various electronic apparatuses.

In this case, the data learner 1310 and the data recognizer 1320 may be mounted together in one electronic apparatus or mounted separately in different electronic apparatuses. For example, one of the data learner 1310 and the data recognizer 1320 may be included in an electronic apparatus, and the other may be included in a server. In a wired or wireless manner, model information constructed by the data learner 1310 may be provided to the data recognizer 1320 and data input to the data recognizer 1320 may be provided to the data learner 1310 as additional training data.

At least one of the data learner 1310 or the data recognizer 1320 may be implemented as a software module. When at least one of the data learner 1310 or the data recognizer 1320 is implemented as a software module (or a program module including instructions), the software module may be stored in a non-transitory computer-readable recording medium. In this case, one or more software modules may be provided by an operating system (OS) or a certain application. Alternatively, some of the one or more software modules may be provided by the OS and the others may be provided by the certain application.

Figure 21:
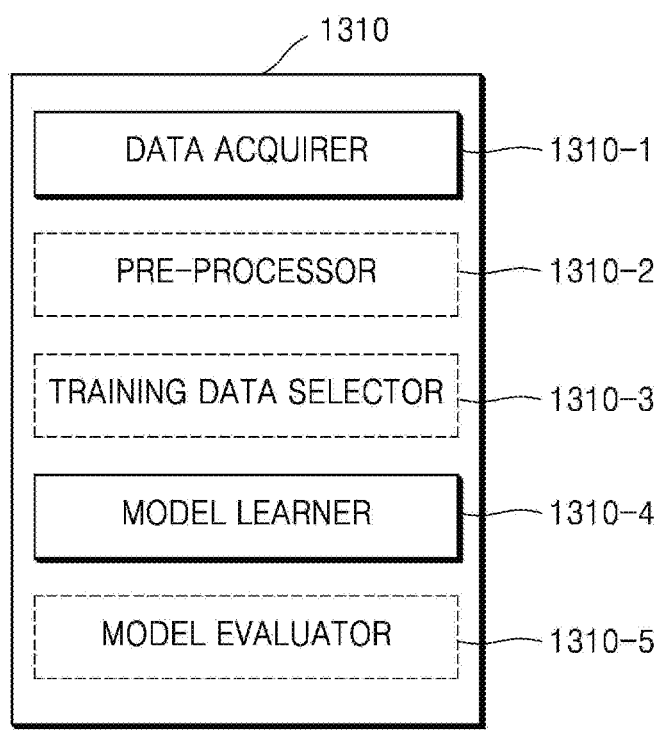
FIG. 21 is a block diagram of a data learner according to an embodiment of the disclosure.

FIG. 21 is a block diagram of the data learner 1310 according to an embodiment of the disclosure.

Referring to FIG. 21, the data learner 1310 according to an embodiment of the disclosure may include a data acquirer 1310-1, a pre-processor 1310-2, a training data selector 1310-3, a model learner 1310-4, and a model evaluator 1310-5.

The data acquirer 1310-1 may acquire data required for at least one of generation of contamination map data, determination of a cleaning target area, or determination of an operation mode of the robotic cleaning apparatus 1000. The data acquirer 1310-1 may acquire data required for learning for at least one of the generation of the contamination map data, the determination of the cleaning target area, or the determination of the operation mode of the robotic cleaning apparatus 1000.

For example, at least one of an image captured by the robotic cleaning apparatus 1000, sensing data sensed by the robotic cleaning apparatus 1000, an image captured by the external device 3000, sensing data sensed by the external device 3000, map data of a cleaning space, contamination map data of another cleaning space, information about a status of the cleaning space, or information about a state of the robotic cleaning apparatus 1000 may be acquired for the learning. However, the data acquired for the learning is not limited thereto and, for example, data inputable to the learning models of FIGS. 9 to 12 may be acquired for the learning.

The pre-processor 1310-2 may pre-process the acquired data to be usable for the learning for at least one of the generation of the contamination map data, the determination of the cleaning target area, or the determination of the operation mode of the robotic cleaning apparatus 1000. The pre-processor 1310-2 may process the acquired data to a preset format in such a manner that the model learner 1310-4 to be described below may use the acquired data for the learning for at least one of the generation of the contamination map data, the determination of the cleaning target area, or the determination of the operation mode of the robotic cleaning apparatus 1000.

The training data selector 1310-3 may select data required for the learning, from the pre-processed data. The selected data may be provided to the model learner 1310-4. The training data selector 1310-3 may select the data required for the learning, from the pre-processed data according to preset criteria for at least one of the generation of the contamination map data, the determination of the cleaning target area, or the determination of the operation mode of the robotic cleaning apparatus 1000. The training data selector 1310-3 may select the data according to preset criteria learned by the model learner 1310-4 to be described below.

The model learner 1310-4 may learn criteria for at least one of the generation of the contamination map data, the determination of the cleaning target area, or the determination of the operation mode of the robotic cleaning apparatus 1000, based on training data. The model learner 1310-4 may learn criteria about which training data needs to be used for at least one of the generation of the contamination map data, the determination of the cleaning target area, or the determination of the operation mode of the robotic cleaning apparatus 1000.

The model learner 1310-4 may learn a data recognition model used for at least one of the generation of the contamination map data, the determination of the cleaning target area, or the determination of the operation mode of the robotic cleaning apparatus 1000 by using training data. In this case, the data recognition model may be a previously constructed model. For example, the data recognition model may be a model previously constructed by receiving basic training data.

The data recognition model may be constructed considering an applicable field of the recognition model, the purpose of learning, or the computer performance of an apparatus, or the like. The data recognition model may be, for example, a model based on a neural network. For example, a model based on a deep neural network (DNN), a recurrent neural network (RNN), or a bidirectional recurrent deep neural network (BRDNN) may be used as the data recognition model. However, the data recognition model is not limited thereto.

According to various embodiments of the disclosure, when a plurality of previously constructed data recognition models are present, the model learner 1310-4 may determine a data recognition model highly relevant to the input training data and the basic training data, as a data recognition model to be learned. In this case, the basic training data may be previously classified according to data types, and the data recognition models may be previously constructed according to data types. For example, the basic training data may be previously classified according to various criteria, e.g., regions where the training data is generated, times when the training data is generated, sizes of the training data, genres of the training data, creators of the training data, and types of objects in the training data.

The model learner 1310-4 may learn the data recognition model by, for example, using a learning algorithm including error back-propagation or gradient descent.

The model learner 1310-4 may learn the data recognition model through, for example, supervised learning using training data as an input value. The model learner 1310-4 may learn the data recognition model through, for example, unsupervised learning for finding criteria for determining a situation, by autonomously learning types of data required to determine the situation without any supervision. The model learner 1310-4 may learn the data recognition model through, for example, reinforcement learning using feedback on whether a result of determining the situation through learning is correct.

When the data recognition model is learned, the model learner 1310-4 may store the learned data recognition model. In this case, the model learner 1310-4 may store the learned data recognition model in memory of an electronic apparatus including the data recognizer 1320. Specifically, the model learner 1310-4 may store the learned data recognition model in memory of an electronic apparatus including the data recognizer 1320 to be described below. Alternatively, the model learner 1310-4 may store the learned data recognition model in memory of a server connected to an electronic apparatus in a wired or wireless network.

In this case, the memory storing the learned data recognition model may also store, for example, commands or data related to at least one other element of the electronic apparatus. The memory may also store software and/or programs. The programs may include, for example, a kernel, middleware, application programming interfaces (APIs), and/or application programs (or "applications").

The model evaluator 1310-5 may input evaluation data to the data recognition model and, when recognition results output using the evaluation data do not satisfy a certain criterion, the model evaluator 1310-5 may request the model learner 1310-4 to learn again. In this case, the evaluation data may be preset data for evaluating the data recognition model.

For example, when the number or a ratio of pieces of evaluation data corresponding to incorrect recognition results among the recognition results of the learned data recognition model for the evaluation data exceeds a preset threshold value, the model evaluator 1310-5 may evaluate that the certain criterion is not satisfied. For example, assuming that the certain criterion is defined a ratio of 2%, when the learned data recognition model outputs wrong recognition results for more than 20 pieces of evaluation data out of a total of 1,000 pieces of evaluation data, the model evaluator 1310-5 may evaluate that the learned data recognition model is not appropriate.

When a plurality of learned data recognition models are present, the model evaluator 1310-5 may evaluate whether each of the learned data recognition models satisfies the certain criterion and determine a model satisfying the certain criterion, as a final data recognition model. In this case, when a plurality of models satisfy the certain criterion, the model evaluator 1310-5 may determine a preset model or a certain number of models selected in the order of evaluation scores, as a final data recognition model(s).

At least one of the data acquirer 1310-1, the pre-processor 1310-2, the training data selector 1310-3, the model learner 1310-4, or the model evaluator 1310-5 in the data learner 1310 may be produced in the form of at least one hardware chip and be mounted in an electronic apparatus. For example, at least one of the data acquirer 1310-1, the pre-processor 1310-2, the training data selector 1310-3, the model learner 1310-4, or the model evaluator 1310-5 may be produced in the form of an exclusive hardware chip for AI, or as a part of a general-use processor (e.g., a CPU or an application processor) or a dedicated graphics processor (e.g., a GPU), and be mounted in various electronic apparatuses.

The data acquirer 1310-1, the pre-processor 1310-2, the training data selector 1310-3, the model learner 1310-4, and the model evaluator 1310-5 may be mounted together in one electronic apparatus or mounted separately in different electronic apparatuses. For example, some of the data acquirer 1310-1, the pre-processor 1310-2, the training data selector 1310-3, the model learner 1310-4, and the model evaluator 1310-5 may be included in an electronic apparatus, and the others may be included in a server.

At least one of the data acquirer 1310-1, the pre-processor 1310-2, the training data selector 1310-3, the model learner 1310-4, or the model evaluator 1310-5 may be implemented as a software module. When at least one of the data acquirer 1310-1, the pre-processor 1310-2, the training data selector 1310-3, the model learner 1310-4, or the model evaluator 1310-5 is implemented as a software module (or a program module including instructions), the software module may be stored in a non-transitory computer-readable recording medium. In this case, one or more software modules may be provided by an OS or a certain application. Alternatively, some of the one or more software modules may be provided by the OS and the others may be provided by the certain application.

Figure 22:
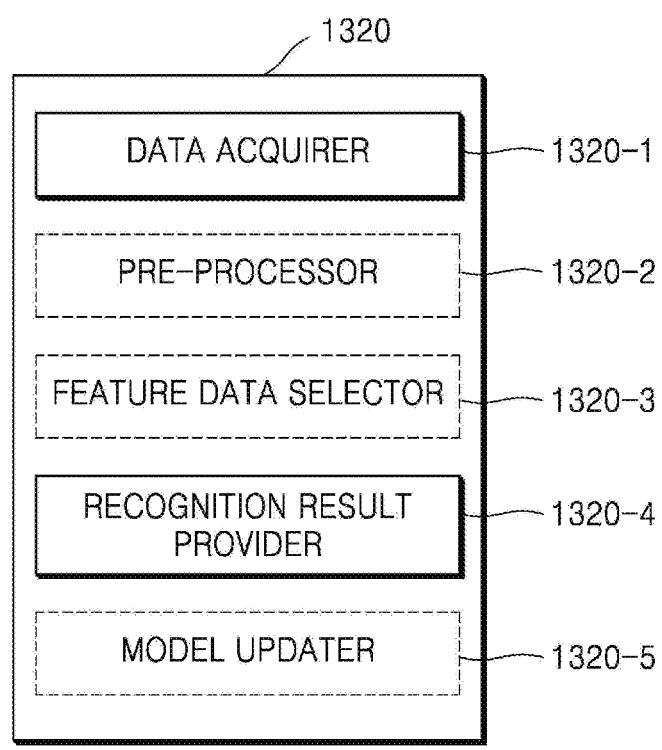
FIG. 22 is a block diagram of a data recognizer according to an embodiment of the disclosure.

FIG. 22 is a block diagram of the data recognizer 1320 according to an embodiment of the disclosure.

Referring to FIG. 22, the data recognizer 1320 according to an embodiment of the disclosure may include a data acquirer 1320-1, a pre-processor 1320-2, a feature data selector 1320-3, a recognition result provider 1320-4, and a model updater 1320-5.

The data acquirer 1320-1 may acquire data required for at least one of generation of contamination map data, determination of a cleaning target area, or determination of an operation mode of the robotic cleaning apparatus 1000, and the pre-processor 1320-2 may pre-process the acquired data to be usable for at least one of the generation of the contamination map data, the determination of the cleaning target area, or the determination of the operation mode of the robotic cleaning apparatus 1000. The pre-processor 1320-2 may process the acquired data to a preset format in such a manner that the recognition result provider 1320-4 to be described below may use the acquired data for at least one of the generation of the contamination map data, the determination of the cleaning target area, or the determination of the operation mode of the robotic cleaning apparatus 1000.

The feature data selector 1320-3 may select data required for at least one of the generation of the contamination map data, the determination of the cleaning target area, or the determination of the operation mode of the robotic cleaning apparatus 1000, from the pre-processed data. The selected data may be provided to the recognition result provider 1320-4. The feature data selector 1320-3 may select a part of or the whole pre-processed data according to preset criteria for at least one of the generation of the contamination map data, the determination of the cleaning target area, or the determination of the operation mode of the robotic cleaning apparatus 1000. The feature data selector 1320-3 may select the data according to preset criteria learned by the model learner 1310-4 described above in relation to FIG. 21.

The recognition result provider 1320-4 may perform at least one of the generation of the contamination map data, the determination of the cleaning target area, or the determination of the operation mode of the robotic cleaning apparatus 1000 by applying the selected data to a data recognition model. The recognition result provider 1320-4 may provide a recognition result according to a purpose of data recognition. The recognition result provider 1320-4 may apply the selected data to the data recognition model by using the data selected by the feature data selector 1320-3, as an input value. The recognition result may be determined by the data recognition model.

For example, at least one of an image captured by the robotic cleaning apparatus 1000, sensing data sensed by the robotic cleaning apparatus 1000, an image captured by the external device 3000, sensing data sensed by the external device 3000, map data of a cleaning space, contamination map data of another cleaning space, information about a status of the cleaning space, or information about a state of the robotic cleaning apparatus 1000 may be acquired for the recognition. However, the data acquired for the recognition is not limited thereto and, for example, data inputable to the learning models of FIGS. 9 to 12 may be acquired for the recognition.

The model updater 1320-5 may request updating of the data recognition model, based on evaluation of the recognition result provided from the recognition result provider 1320-4. For example, the model updater 1320-5 may request the model learner 1310-4 to update the data recognition model, by providing the recognition result provided from the recognition result provider 1320-4, to the model learner 1310-4.

At least one of the data acquirer 1320-1, the pre-processor 1320-2, the feature data selector 1320-3, the recognition result provider 1320-4, or the model updater 1320-5 in the data recognizer 1320 may be produced in the form of at least one hardware chip and be mounted in an electronic apparatus. For example, at least one of the data acquirer 1320-1, the pre-processor 1320-2, the feature data selector 1320-3, the recognition result provider 1320-4, or the model updater 1320-5 may be produced in the form of an exclusive hardware chip for AI, or as a part of a general-use processor (e.g., a CPU or an application processor) or a dedicated graphics processor (e.g., a GPU), and be mounted in various electronic apparatuses.

The data acquirer 1320-1, the pre-processor 1320-2, the feature data selector 1320-3, the recognition result provider 1320-4, and the model updater 1320-5 may be mounted together in one electronic apparatus or mounted separately in different electronic apparatuses. For example, some of the data acquirer 1320-1, the pre-processor 1320-2, the feature data selector 1320-3, the recognition result provider 1320-4, and the model updater 1320-5 may be included in an electronic apparatus, and the others may be included in a server.

At least one of the data acquirer 1320-1, the pre-processor 1320-2, the feature data selector 1320-3, the recognition result provider 1320-4, or the model updater 1320-5 may be implemented as a software module. When at least one of the data acquirer 1320-1, the pre-processor 1320-2, the feature data selector 1320-3, the recognition result provider 1320-4, or the model updater 1320-5 is implemented as a software module (or a program module including instructions), the software module may be stored in a non-transitory computer-readable recording medium. In this case, one or more software modules may be provided by an OS or a certain application. Alternatively, some of the one or more software modules may be provided by the OS and the others may be provided by the certain application.

Figure 23:
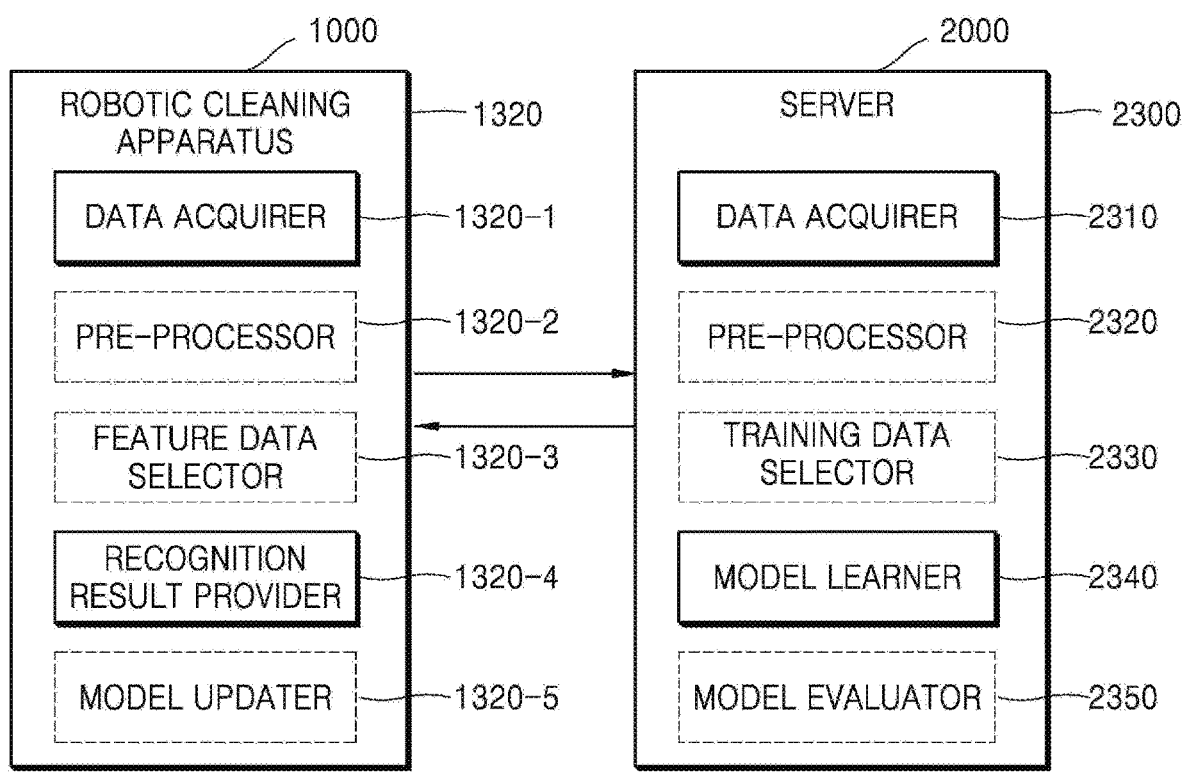
FIG. 23 is a block diagram showing an example in which the robotic cleaning apparatus and the server learn and recognize data in association with each other, according to an embodiment of the disclosure.

FIG. 23 is a block diagram showing an example in which the robotic cleaning apparatus 1000 and the server 2000 learn and recognize data in association with each other, according to an embodiment of the disclosure.

Referring to FIG. 23, the server 2000 may learn criteria for at least one of generation of contamination map data, determination of a cleaning target area, or determination of an operation mode of the robotic cleaning apparatus 1000, and the robotic cleaning apparatus 1000 may perform at least one of the generation of the contamination map data, the determination of the cleaning target area, or the determination of the operation mode of the robotic cleaning apparatus 1000, based on a learning result of the server 2000.

In this case, the server 2000 may serve as the data learner 1310 illustrated in FIG. 21. A data acquirer 2310 may serve as the data acquirer 1310-1 illustrated in FIG. 21. A pre-processor 2320 may serve as the pre-processor 1310-2 illustrated in FIG. 21. A training data selector 2330 may serve as the training data selector 1310-3 illustrated in FIG. 21. A model learner 2340 may serve as the model learner 1310-4 illustrated in FIG. 21. A model evaluator 2350 may serve as the model evaluator 1310-5 illustrated in FIG. 21. The server 2000 may learn which data is used for at least one of the generation of the contamination map data, the determination of the cleaning target area, or the determination of the operation mode of the robotic cleaning apparatus 1000, and learn criteria for at least one of the generation of the contamination map data, the determination of the cleaning target area, or the determination of the operation mode of the robotic cleaning apparatus 1000 by using the data. The model learner 2340 may learn the criteria for at least one of the generation of the contamination map data, the determination of the cleaning target area, or the determination of the operation mode of the robotic cleaning apparatus 1000 by acquiring data to be used for learning, and applying the acquired data to a data recognition model.

The recognition result provider 1320-4 of the robotic cleaning apparatus 1000 may perform at least one of the generation of the contamination map data, the determination of the cleaning target area, or the determination of the operation mode of the robotic cleaning apparatus 1000 by applying data selected by the feature data selector 1320-3, to the data recognition model generated by the server 2000. For example, the recognition result provider 1320-4 may transmit the data selected by the feature data selector 1320-3, to the server 2000 to request to decide at least one of the generation of the contamination map data, the determination of the cleaning target area, or the determination of the operation mode of the robotic cleaning apparatus 1000, and the server 2000 may apply the data selected by the feature data selector 1320-3, to the data recognition model to decide at least one of the generation of the contamination map data, the determination of the cleaning target area, or the determination of the operation mode of the robotic cleaning apparatus 1000. The recognition result provider 1320-4 may receive information about the decision of the server 2000, from the server 2000.

Alternatively, the recognition result provider 1320-4 of the robotic cleaning apparatus 1000 may receive the data recognition model generated by the server 2000, from the server 2000, and perform at least one of the generation of the contamination map data, the determination of the cleaning target area, or the determination of the operation mode of the robotic cleaning apparatus 1000 by using the received data recognition model. In this case, the recognition result provider 1320-4 of the robotic cleaning apparatus 1000 may apply the data selected by the feature data selector 1320-3, to the data recognition model received from the server 2000.

Figure 24:
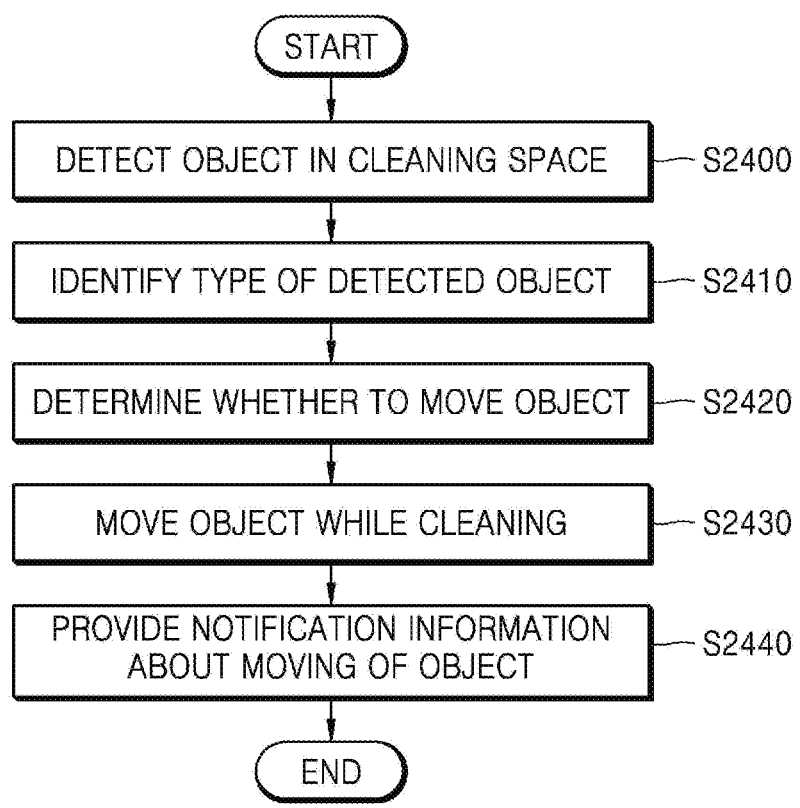
FIG. 24 is a flowchart of a method, performed by the robotic cleaning apparatus, of moving an object in a cleaning space to a certain location, according to an embodiment of the disclosure.

FIG. 24 is a flowchart of a method, performed by the robotic cleaning apparatus 1000, of moving an object in a cleaning space to a certain location, according to an embodiment of the disclosure.

Referring to FIG. 24, in operation S2400, an object in a cleaning space may be detected. The robotic cleaning apparatus 1000 may detect the object in the cleaning space by using at least one sensor of the robotic cleaning apparatus 1000. The robotic cleaning apparatus 1000 may detect the object by using at least one of, for example, a mono/stereo vision camera, a lidar, an ultrasonic sensor, an infrared sensor, or a RF sensor. The robotic cleaning apparatus 1000 may detect a location and a size of the object in the cleaning space by using, for example, a lidar sensor. The robotic cleaning apparatus 1000 may detect material properties of the object in the cleaning space by using, for example, a RF sensor. The robotic cleaning apparatus 1000 may, for example, capture an image of the object in the cleaning space.

In operation S2410, the robotic cleaning apparatus 1000 may identify a type of the detected object. The robotic cleaning apparatus 1000 may identify the type of the object by using sensing data about the object detected in operation S2400. By identifying the type of the object, the robotic cleaning apparatus 1000 may determine whether the detected object is a waste. The robotic cleaning apparatus 1000 may determine whether the detected object is a significant object, by identifying the type of the object. The robotic cleaning apparatus 1000 may determine whether the detected object needs to be moved, by identifying the type of the object.

The robotic cleaning apparatus 1000 may identify a type or properties of the object by inputting the sensing data to at least one learning model. In this case, the learning model for identifying the type or the properties of the object may use various data processing methods such as deep learning and image processing, but is not limited thereto.

In operation S2420, the robotic cleaning apparatus 1000 may determine whether to move the object. When the object is determined as being not significant, the robotic cleaning apparatus 1000 may determine that the object needs to be trashed, and determine not to move the object. Otherwise, when the object is determined as being significant, the robotic cleaning apparatus 1000 may determine whether to move the object. For example, the robotic cleaning apparatus 1000 may determine a remote controller, a pen, a ring, a coin, a button, or the like as a movable significant object. In addition, for example, the robotic cleaning apparatus 1000 may determine a fragile object such as a hand mirror, a drinking glass, or a ceramic plate, as an unmovable significant object.

The robotic cleaning apparatus 1000 may determine whether to move the object, by inputting a value about the type or the properties of the object to a certain learning model, but is not limited thereto. As the robotic cleaning apparatus 1000 inputs the sensing data to the certain learning model, resultant values of operations S2410 and S2420 may be output from the learning model.

In operation S2430, the robotic cleaning apparatus 1000 may move the object while cleaning. The robotic cleaning apparatus 1000 may move the object to a certain location according to preset criteria.

For example, the robotic cleaning apparatus 1000 may set the location to which the object is to be moved, in such a manner that all significant objects are moved to one location. For example, the robotic cleaning apparatus 1000 may set the location to which the object is to be moved, in such a manner that different types of objects are moved to different locations. For example, the robotic cleaning apparatus 1000 may set the location to which the object is to be moved, in such a manner that only a specific object designated by a user is moved to a certain location. In this case, the robotic cleaning apparatus 1000 may display a GUI for setting the location to which the object is to be moved, on a screen of the robotic cleaning apparatus 1000. The GUI for setting the location to which the object is to be moved may also be displayed on a screen of the mobile device 4000 capable of controlling the robotic cleaning apparatus 1000.

The robotic cleaning apparatus 1000 may determine a timing for moving the significant object, according to preset criteria. For example, the robotic cleaning apparatus 1000 may move the significant object to a certain place after determining the cleaning target area and setting a route to clean the cleaning target area and before performing cleaning. For example, the robotic cleaning apparatus 1000 may move the significant object to a certain place after completely cleaning the cleaning target area. For example, when the significant object is found during cleaning, the robotic cleaning apparatus 1000 may interrupt the cleaning operation, move the significant object, and then return to the location of the robotic cleaning apparatus 1000, where the cleaning operation is interrupted, to continue the cleaning operation. In this case, the robotic cleaning apparatus 1000 may display a GUI for setting the timing for moving the significant object, on the screen of the robotic cleaning apparatus 1000. The GUI for setting the timing for moving the significant object may also be displayed on the screen of the mobile device 4000 capable of controlling the robotic cleaning apparatus 1000.

While the significant object is being moved, the robotic cleaning apparatus 1000 may interrupt at least one of cleaning functions thereof, e.g., suction and brushing.

The robotic cleaning apparatus 1000 may create a route for moving the significant object to the certain location, and move the object to the certain location along the created route. In this case, the route for moving the significant object to the certain location may be created to move the significant object without contaminating an area already cleaned by the robotic cleaning apparatus 1000 in the cleaning space. The robotic cleaning apparatus 1000 may create the route differently depending on whether the significant object is located in the already cleaned area.

The robotic cleaning apparatus 1000 may create the route for moving the significant object, by using at least one learning model. In this case, the robotic cleaning apparatus 1000 may determine the route of the significant object by inputting a map of the cleaning space, information about the object in the cleaning space, information about the cleaned area of the cleaning space, and setup information about moving of the significant object, to the learning model. In operation S2440, the robotic cleaning apparatus 1000 may output notification information about the moving of the object. The robotic cleaning apparatus 1000 may output various types of notification information according to the type of the object. For example, the robotic cleaning apparatus 1000 may output notification information indicating that the significant object is found. For example, the robotic cleaning apparatus 1000 may move the significant object and then output notification information indicating a place to which the significant object is moved. For example, when the significant object is determined as being fragile or hardly movable, the robotic cleaning apparatus 1000 may not move the significant object and merely output notification information indicating that the significant object is found or indicating a location where the significant object is found.

The robotic cleaning apparatus 1000 may output the notification information through an outputter of the robotic cleaning apparatus 1000. In this case, the notification information may include, for example, text data, image data, and sound data, but is not limited thereto. The robotic cleaning apparatus 1000 may provide the notification information to the mobile device 4000 capable of controlling the robotic cleaning apparatus 1000.

The method of FIG. 24 may be performed by the robotic cleaning apparatus 1000 together with the operations of the robotic cleaning apparatus 1000, which are described above in relation to FIGS. 1 to 23.

An embodiment of the disclosure may be implemented in the form of a computer-readable recording medium including instructions executable by a computer, e.g., a program module executed by a computer. The computer-readable recording medium may be an arbitrary available medium accessible by a computer, and examples thereof include all volatile, nonvolatile media, removable, and non-removable media. The computer-readable recording medium may include a computer storage medium. Examples of the computer storage medium include all volatile, nonvolatile media, removable, and non-removable media implemented using an arbitrary method or technology for storing information such as computer-readable instructions, data structures, program modules, or other data.

As used herein, a suffix "unit" or "---er/or" may indicate a hardware component such as a processor or a circuit, and/or a software component executed by the hardware component such as the processor.

It should be understood that embodiments of the disclosure should be considered in a descriptive sense only and not for purposes of limitation. Descriptions of features or aspects within each embodiment of the disclosure should be considered as available for other similar features or aspects in other embodiments of the disclosure. For example, each component described to be of a single type may be implemented in a distributed manner. Likewise, components described to be distributed may be implemented in a combined manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robotic cleaning apparatus for cleaning a cleaning space, the robotic cleaning apparatus comprising:
 a communication interface;
 a memory storing one or more instructions; and
 at least one processor configured to:
  execute the one or more instructions to control the robotic cleaning apparatus to generate map data of the cleaning space, execute the one or more instructions to acquire contamination data indicating a contamination level of the cleaning space,
acquire contamination map data based on the contamination data,
obtain contamination map data based on the map data, the contamination data, and information related to a time when the contamination data is acquired, wherein the contamination map data includes a plurality of contamination maps corresponding to different time periods,
determine at least one cleaning target area in the cleaning space and a priority for the at least one cleaning target area, based on a contamination map corresponding to a current time from among the plurality of contamination maps included in the contamination map data, and
clean the determined at least one cleaning target area according to the determined priority for the at least one cleaning target area,
wherein the contamination map data comprises:
information indicating locations of contaminated areas in the cleaning space,
contamination levels of the contaminated areas, and locations of objects in the cleaning space.

2. The robotic cleaning apparatus of claim 1, wherein the at least one cleaning target area is determined by applying the contamination data and the contamination map data to at least one learning model learned to determine a location and a priority of the at least one cleaning target area in the cleaning space.

3. The robotic cleaning apparatus of claim 2,
wherein the at least one cleaning target area is determined by applying another contamination map data similar to the contamination map data of the cleaning space by a certain value or more, to the at least one learning model, and
wherein the other contamination map data is data about another cleaning space similar to the cleaning space by a certain value or more.

4. The robotic cleaning apparatus of claim 1, wherein the contamination data is acquired, based on an image captured by a camera of the robotic cleaning apparatus and sensing data sensed by a sensor of the robotic cleaning apparatus.

5. The robotic cleaning apparatus of claim 1, wherein the contamination data is acquired, based on a captured image received from a camera installed in the cleaning space and sensing data received from a sensor installed in the cleaning space.

6. The robotic cleaning apparatus of claim 1, wherein the at least one processor is further configured to execute the one or more instructions to:
determine a cleaning strength of the robotic cleaning apparatus in the determined at least one cleaning target area.

7. The robotic cleaning apparatus of claim 6, wherein the at least one processor is further configured to execute the one or more instructions to:
determine one of a plurality of operation modes of the robotic cleaning apparatus; and
determine the at least one cleaning target area, based on the determined operation mode.

8. The robotic cleaning apparatus of claim 7, wherein the cleaning strength of the robotic cleaning apparatus in the at least one cleaning target area is determined based on the determined operation mode.

9. The robotic cleaning apparatus of claim 7, wherein the plurality of operation modes comprise at least two of a quick mode, a low-noise mode, and a normal mode.

10. The robotic cleaning apparatus of claim 1, wherein the at least one processor is further configured to execute the one or more instructions to:
acquire battery level information of the robotic cleaning apparatus; and
determine the at least one cleaning target area, based on the battery level information.

11. A method, performed by a robotic cleaning apparatus, of cleaning a cleaning space, the method comprising:
obtaining map data of the cleaning space;
acquiring contamination data indicating a contamination level of the cleaning space;
acquiring contamination map data based on the contamination data;
obtaining contamination map data based on the map data, the contamination data, and information related to a time when the contamination data is acquired, wherein the contamination map data includes a plurality of contamination maps corresponding to different time periods,
determining at least one cleaning target area in the cleaning space and a priority for the at least one cleaning target area, based on a contamination map corresponding to a current time from among the plurality of contamination maps included in the contamination map data; and
cleaning the determined at least one cleaning target area according to the determined priority for the at least one cleaning target area,
wherein the contamination map data comprises information indicating locations of contaminated areas in the cleaning space, contamination levels of the contaminated areas, and locations of objects in the cleaning space.

12. The method of claim 11, wherein the at least one cleaning target area is determined by applying the contamination data and the contamination map data to a learning model learned to determine a location and a priority of the at least one cleaning target area in the cleaning space.

13. The method of claim 12,
wherein the at least one cleaning target area is determined by applying another contamination map data similar to the contamination map data of the cleaning space by a certain value or more, to the learning model, and
wherein the other contamination map data is data about another cleaning space similar to the cleaning space by a certain value or more in terms of a structure of the cleaning space and the locations of the objects in the cleaning space.

14. The method of claim 11, wherein the contamination data is acquired, based on an image captured by a camera of the robotic cleaning apparatus and sensing data sensed by a sensor of the robotic cleaning apparatus.

15. The method of claim 11, wherein the acquiring of the contamination data comprises acquiring the contamination data, based on a captured image received from a camera installed in the cleaning space and sensing data received from a sensor installed in the cleaning space.

16. The method of claim 11, wherein the determining of the at least one cleaning target area comprises:
determining a cleaning strength of the robotic cleaning apparatus in the determined at least one cleaning target area.

17. The method of claim 16, further comprising:
  determining one of a plurality of operation modes of the robotic cleaning apparatus,
  wherein the determining of the at least one cleaning target area comprises determining the at least one cleaning target area, based on the determined operation mode.

18. The method of claim 17, wherein the cleaning strength of the robotic cleaning apparatus in the at least one cleaning target area is determined based on the determined operation mode.

19. The method of claim 11, further comprising:
  acquiring battery level information of the robotic cleaning apparatus,
  wherein the determining of the at least one cleaning target area comprises determining the at least one cleaning target area, based on the battery level information.

20. A computer program product comprising a non-transitory computer-readable recording medium having recorded thereon a plurality of instructions that instruct at least one processor to perform the method of claim 11 on a computer.

21. The robotic cleaning apparatus of claim 1, wherein the contamination data indicating the contamination level of the cleaning space is acquired based on real-time data from a closed-circuit television (CCTV) in the cleaning space.

* * * * *